United States Patent [19]

Nakajima et al.

[11] Patent Number: 5,066,113
[45] Date of Patent: Nov. 19, 1991

[54] PROJECTING LENS
[75] Inventors: Masaya Nakajima, Tokyo; Atsushi Sekine, Kasukabe, both of Japan
[73] Assignee: Nikon Corporation, Tokyo, Japan
[21] Appl. No.: 568,045
[22] Filed: Aug. 16, 1990
[30] Foreign Application Priority Data Aug. 18, 1989 [JP] Japan ................................. 1-212674
Sep. 19, 1989 [JP] Japan ................................. 1-242506

[51] Int. Cl.$^5$ ............................................. G02B 3/00
[52] U.S. Cl. ................................... 359/649; 359/676; 359/708; 359/754
[58] Field of Search ............... 350/463, 412, 432, 423, 350/426

[56] References Cited
U.S. PATENT DOCUMENTS 3,609,006 9/1971 Pospisil ..................... 354/423
4,548,480 10/1985 Yamamoto et al. ................. 350/432
4,603,950 8/1986 Uehara et al. ....................... 350/432
4,770,513 9/1988 Fujie et al. ........................... 350/432

Primary Examiner—Bruce Y. Arnold
Assistant Examiner—Hung Xuan Dang
Attorney, Agent, or Firm—Shapiro and Shapiro

[57] ABSTRACT

A projecting lens comprising, when viewed from a screen, a first lens group having positive refracting power and an aspherical lens thereof; a second lens group having positive refracting power, a third lens group having positive refracting power and an aspherical lens, and a fourth lens group having negative refracting power, wherein the following conditions are met assuming that the focal distance of the first lens group is $f_{G1}$, the focal distance of the third lens group is $f_{G3}$ and the focal distance of the overall system is f: $0 = f/f_{G1} < 0.25$, $0 = f/f_{G3} < 0.3$.

32 Claims, 6 Drawing Sheets

PROJECTING LENS

BACKGROUND OF THE INVENTION

1. Field of the Invention

The present invention relates to a projecting lens, and, more particularly, to a projecting lens for a video projector for forming a bright and large image scope by projecting a CRT image.

2. Related Background Art

Recently, a video projector has been widely used for the purpose of forming a large-size TV image by reproduction. The performance of the projecting lens for the video projector is a critical factor when an excellent image quality is desired in the reproduced image. In order to obtain the bright image in a video projector of the type described above, a bright projecting lens of a large aperture is necessary. Furthermore, the angle of the projecting lens must be widened for the purpose of shortening the depth of the cabinet, that is, the projecting apparatus by shortening the distance from the surface of the CRT (Cathode Ray Tube), on which CRT image is positioned, to the screen.

In general, a video projector must have three projecting lenses so as to correspond to the CRTs of the three colors: B (blue), G (green) and R (red). In order to reduce the size and the weight of the lens for the purpose of reducing the cost and realizing the above-described high-level specification, a variety of projecting lenses using an aspherical lens have been disclosed.

A conventional projecting lens disclosed, for example, in U.S. Pat. No. 4,548,480 comprises, as shown in FIG. 1, three lenses. That is, it is constituted, when viewed from a screen (in a left portion of the drawing), a first lens $L_1$ having positive refracting power, a biconvex second lens $L_2$ having positive refracting power and a third lens $L_3$ having negative refracting power and the strong curvature side of which faces the screen. Furthermore, an aspherical plastic lens is employed as the first lens $L_1$ and the third lens $L_3$ for the purpose of improving the image forming performance by correcting the aberrations. However, as shown in FIG. 2, a so-called warp of high-degree aberration is generated in the distortion in such a manner that a positive directional displacement occurs at the intermediate field angle and a negative directional displacement occurs at the outermost portion.

In the case where an excessive high-degree warp is, as shown in FIG. 2, generated in the distortion of a projecting lens of a three-tube type projector, the image designated by a dashed line and a continuous line of FIG. 4A becomes distorted as shown in FIG. 4B when images of cathode ray tubes $T_B$, $T_G$ and $T_R$ are, as shown in FIG. 3, projected on a screen $S_C$ by using projecting lenses $L_B$, $L_G$ and $L_R$ in accordance with a movement principle. As a result, the correction cannot be easily performed by the CRT side. Therefore, the color deviation is generated in the peripheral portion of the field angle, causing the quality of the projected image to be deteriorated.

In order to correct a high degree aberration in the distortion, the applicant of the present invention has disclosed a projecting lens in U.S. Pat. No. 4,770,513. According to that disclosure, the basic structure is arranged in such a manner that a meniscus lens the convex side of which faces the screen is disposed between the second lens group and the third lens group which serves as a field flattener. According to the projecting lens disclosed in U.S. Pat. No. 4,770,513, the high degree aberration in the distortion can be satisfactorily corrected with sufficiently securing the image brightness and the wide angle. However, it cannot be satisfactorily form a large magnification image. That is, when the magnification is enlarged, the various aberrations are also enlarged. As a result, the brightness and the wide angle cannot be easily realized in this case, causing a future necessity of sufficiently correcting the above-described various aberrations to be arisen.

There has been arisen a desire for a video projector to have a focusing mechanism capable of varying the projecting magnification by using a sole projecting lens in order to meet the status in which the video projector is used.

The conventional projecting lens for a video projector has been arranged in such a manner that focusing is performed by fixing a lens group including a field flattener and by integrally moving all of the lens groups that are positioned more adjacent to the screen than the fixed lens group in the direction of the optical axis.

In this case, although a fine adjustment of the projecting magnification can be satisfactorily performed at the time of performing the projection of an image to a predetermined screen, the excessive deterioration in the image quality due to the image surface movement on the screen cannot be prevented when the projecting magnification is desired to be changed in accordance with the change in the size of the screen. Furthermore, according to a focusing method of the type described above, the overall length of the lens is changed, causing a problem to be arisen in that the distance of the projection (the distance from the screen to the projecting lens) is undesirably changed at the time of the fine adjustment of the magnification.

SUMMARY OF THE INVENTION

Accordingly, an object of the present invention is to provide a projecting lens capable of realizing large projecting magnification, simultaneously correcting a variety of aberrations including a high-degree deviation and thereby exhibiting a totally excellent image forming performance.

Another object of the present invention is to provide a high performance projecting lens for a video projector capable of overcoming the above-described problems and satisfactorily correcting the image movement on the screen due to the change in the magnification caused from the focusing and thereby preferably used in screens of a variety of sizes.

In order to achieve the above-described first object, the present invention is constituted basing upon U.S. Pat. No. 4,770,513 disclosed by the applicant of the present invention. That is, there is provided a projecting lens for projecting an image on a CRT scope as the object to be projected, comprising, when viewed from the screen, a first lens group having positive refracting power, a second lens group having positive refracting power, a third lens group having positive refracting power and a fourth lens group having negative refracting power, wherein each of the first lens group and the third lens group has an aspherical surface. Furthermore, the structure thus constituted is arranged so as to meet the following relationships assuming that the focal distance of the overall body of the system is f, the focal distance of the first lens group is $f_{G1}$ and the focal distance of the third lens group is $f_{G3}$:

$$0 < f/f_{G1} < 0.25$$

$$0 < f/f_{G3} < 0.3$$

In order to achieve the above-described second embodiment, according to the present invention, there is provided a projecting lens for projecting an image on a CRT serving as an object surface, comprising, when viewed from a screen, a front fixed-lens unit having positive refracting power, a movable lens group having positive refracting power and a rear fixed-lens unit having negative refracting power, wherein the front fixed-lens unit and the rear fixed-lens unit are fixed and the movable lens group is moved along the optical axis at the time of focusing. As a result, a so-called "an inner focusing method" is realized.

The thus constituted structure is arranged so as to meet the following relationships assuming that the focal distance of the overall body of the system is f and the focal distance of the movable lens group is $f_F$:

$$0.8 < \frac{f_F}{f} < 1.1$$

The projecting lens preferably used in the above-described focusing method specifically comprises, when viewed from the screen, a first lens group having positive refracting power and constituted by the front fixed-lens unit and a portion of the movable lens group, a second lens group serving as the movable lens group and having positive refracting power, a third lens group having positive refracting power and a fourth lens group including the rear fixed lens unit and having negative refracting power. It is preferable that each of the first lens group and the third lens group be constituted by a movable aspherical lens having, on at least one side of which, an aspherical surface.

It is further preferable that the following relationships, which are the conditions with which the first object of the present invention can be achieve, be met assuming that the focal distance of the first lens group is $f_{G1}$ and the focal distance of the third lens group is $f_{G3}$:

$$0 < f/f_{G1} < 0.25$$

$$0 < f/f_{G3} < 0.3$$

As described above, according to the present invention, a projecting lens for a video projector can be realized which exhibits the brightness of an aperture ratio of 1:1.25, a half wide angle of about 25° and large projecting magnification of 18.5 to 28.7 times and which has excellent image forming performance capable of, in particular, satisfactorily correcting the distortion and the chromatic aberration.

Since the projecting lens exhibits the wide angle, it can contribute to constitute a compact apparatus. Furthermore, the high degree warp of the distortion can be satisfactorily corrected although the wide angle is realized. Therefore, the change in the magnification due to the movement effect can be easily corrected by changing the scanning magnification of the CRT of a three-tube type projecting apparatus. In addition, since the chromatic aberration can be satisfactorily corrected with large projecting magnification realized, the projecting lens according to the present invention can be preferably used to form high quality image (High Vision).

As a result, the images from the three tubes: B, G and R can be correctly overlapped even if they are positioned in the peripheral portion. Therefore, a clear color projected image without color bleeding can be obtained.

According to the present invention, a projecting lens for a video projector can be provided in which, even if the focusing corresponding to the size of the screen is performed, the image surface change due to the focusing can be satisfactorily prevented and excellent image forming performance can be obtained in any focusing states.

In particular, the chromatic aberration taken place as a problem when a CRT image is projected to a screen with a large magnification by the focusing can be satisfactorily corrected. Therefore, the projecting lens according to the present invention can be preferably used to form a high quality image (High Vision).

As a result, the images from the three tubes: B, G and R can be correctly overlapped even if they are positioned in the peripheral portion. Therefore, a clear color projected image without color bleeding can be obtained.

Furthermore, a wide angle lens can be obtained so that the size of the apparatus can be reduced and the high-degree warp in the distortion taken place due to the wide angle arrangement can be satisfactorily corrected. Therefore, the change in the magnification due to the movement effect can be easily corrected by changing the scanning magnification of the CRT.

Other and further objects, features and advantages of the invention will be appear more fully from the following description.

DESCRIPTION OF THE PREFERRED EMBODIMENTS

Preferred embodiments of the present invention will now be described with reference to the drawings.

Figure 4A:
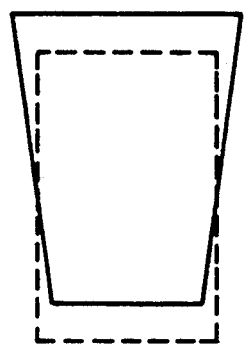
FIG. 4A is a plan view which illustrates the state of the projected image due to the movement of the projecting lens which has been satisfactorily corrected as shown in the distortion graph.
Figure 4B:
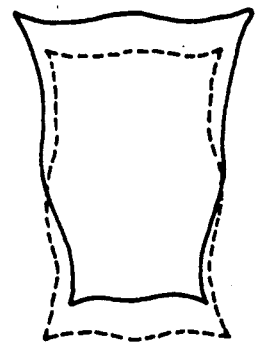
FIG. 4B is a plan view which illustrates the projected image due to the movement of the conventional projecting lens shown in FIG. 1.
Figure 3:
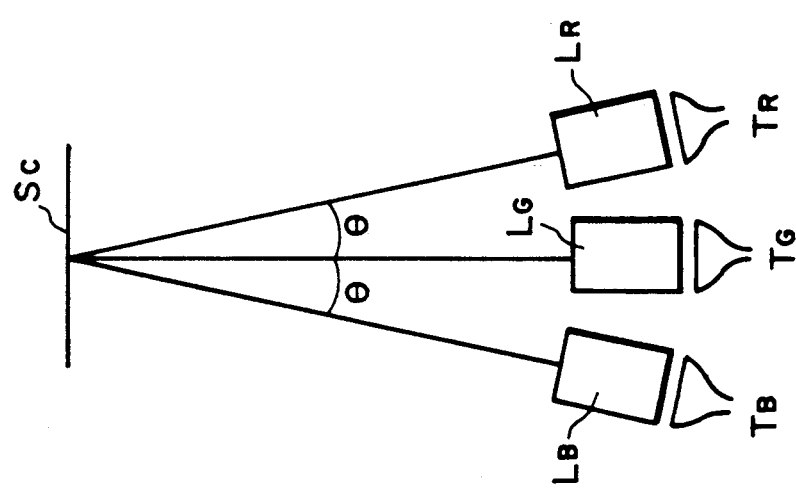
FIG. 3 illustrates the arrangement of a projecting lenses for a three-tube type video projector.
Figure 1:
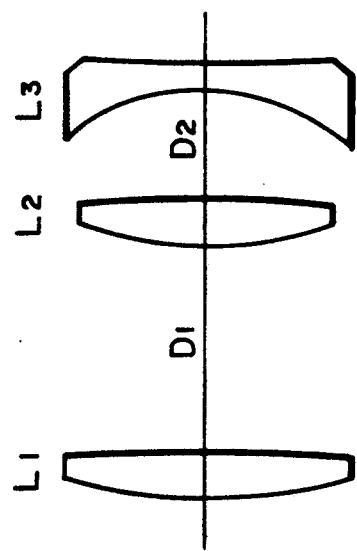
FIG. 1 illustrates the configuration of lenses for a conventional projecting lens for a video projector.
Figure 2:
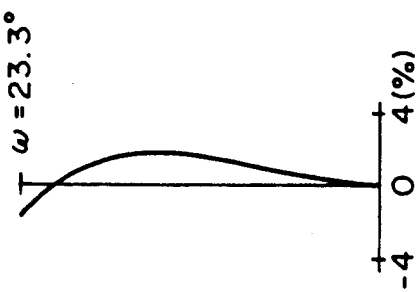
FIG. 2 is a graph which illustrates the distortion of the projecting lens shown in FIG. 1.
Figure 5:
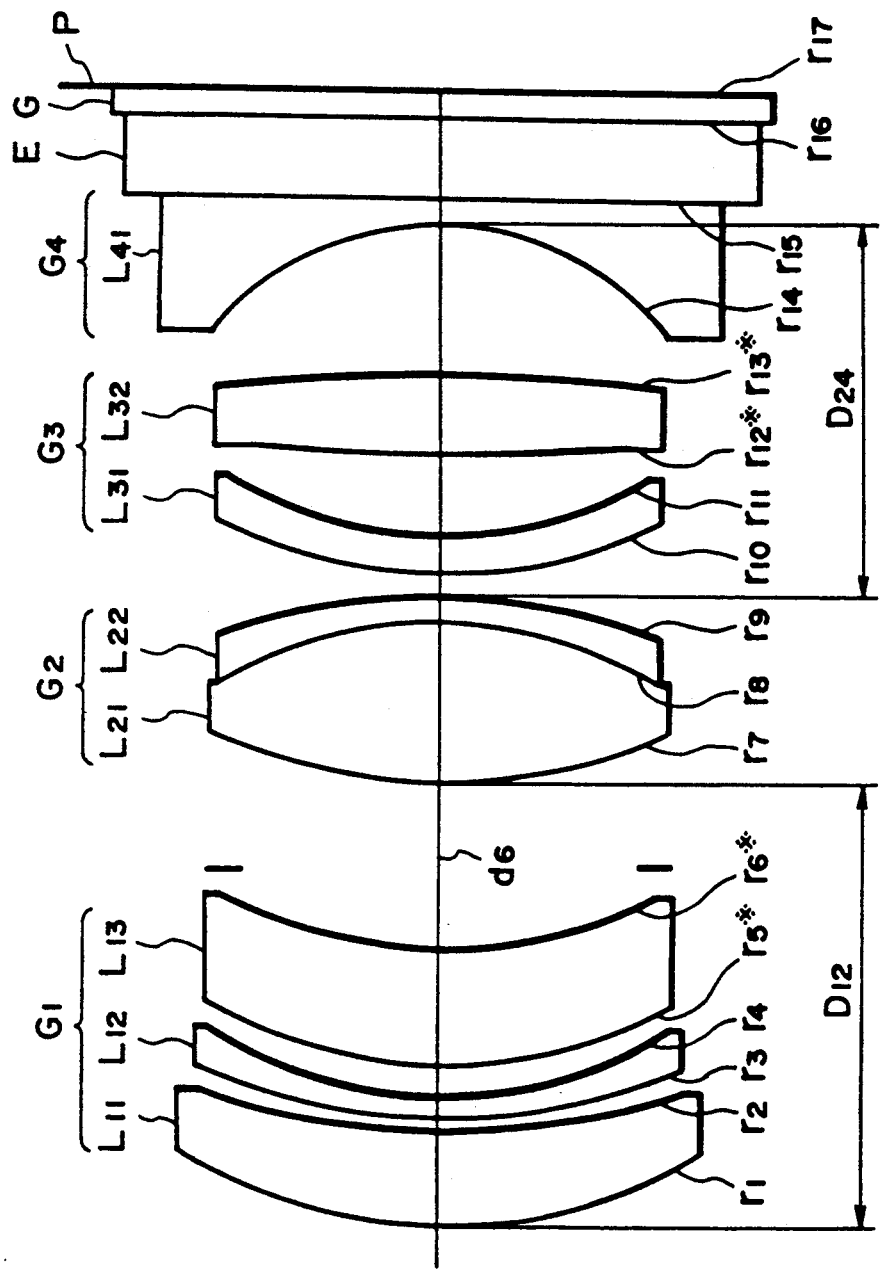
FIG. 5 illustrates the configuration of the lenses for the projecting lens according to a first embodiment of the present invention.
Figure 6:
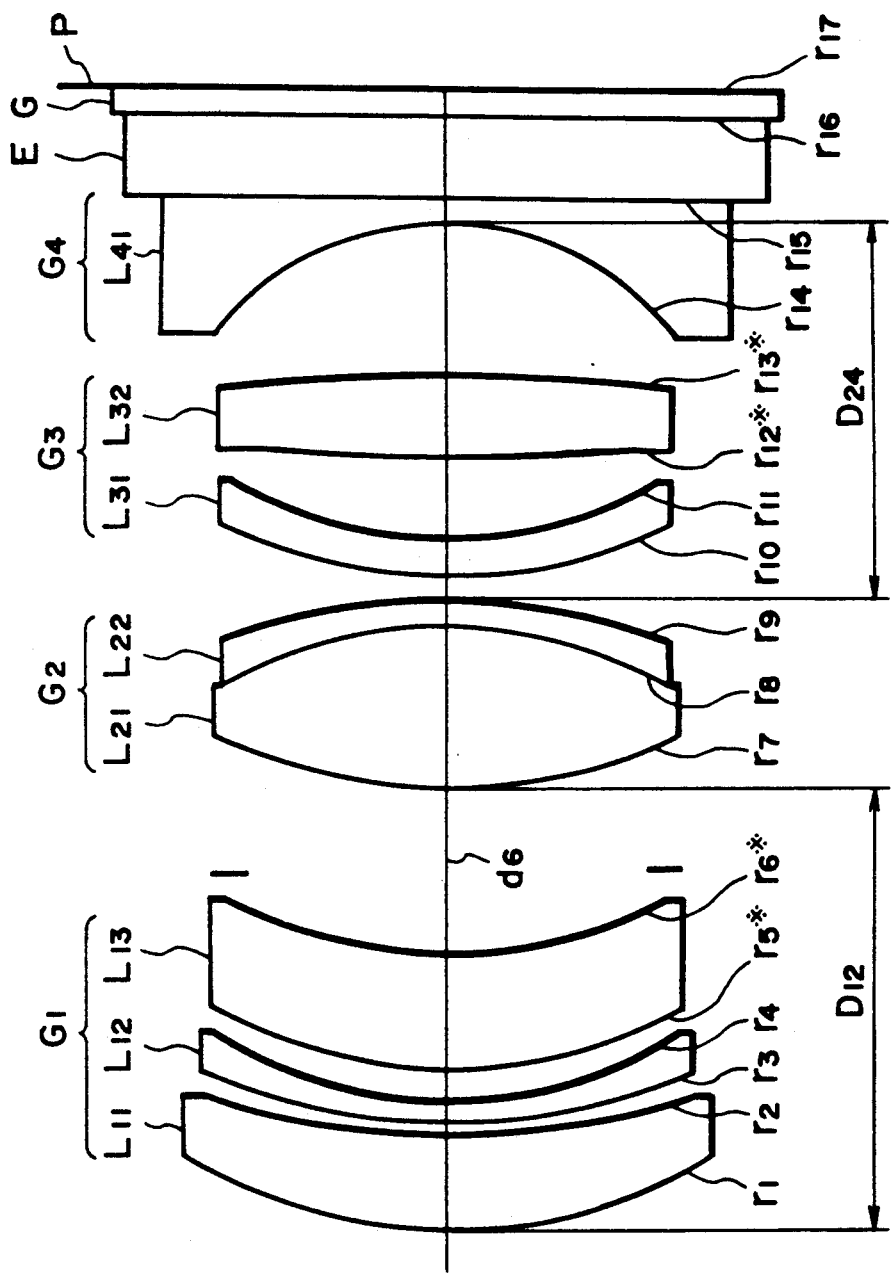
FIG. 6 illustrates the configuration of the lenses for the projecting lens according to a second embodiment of the present invention.
Figure 7:
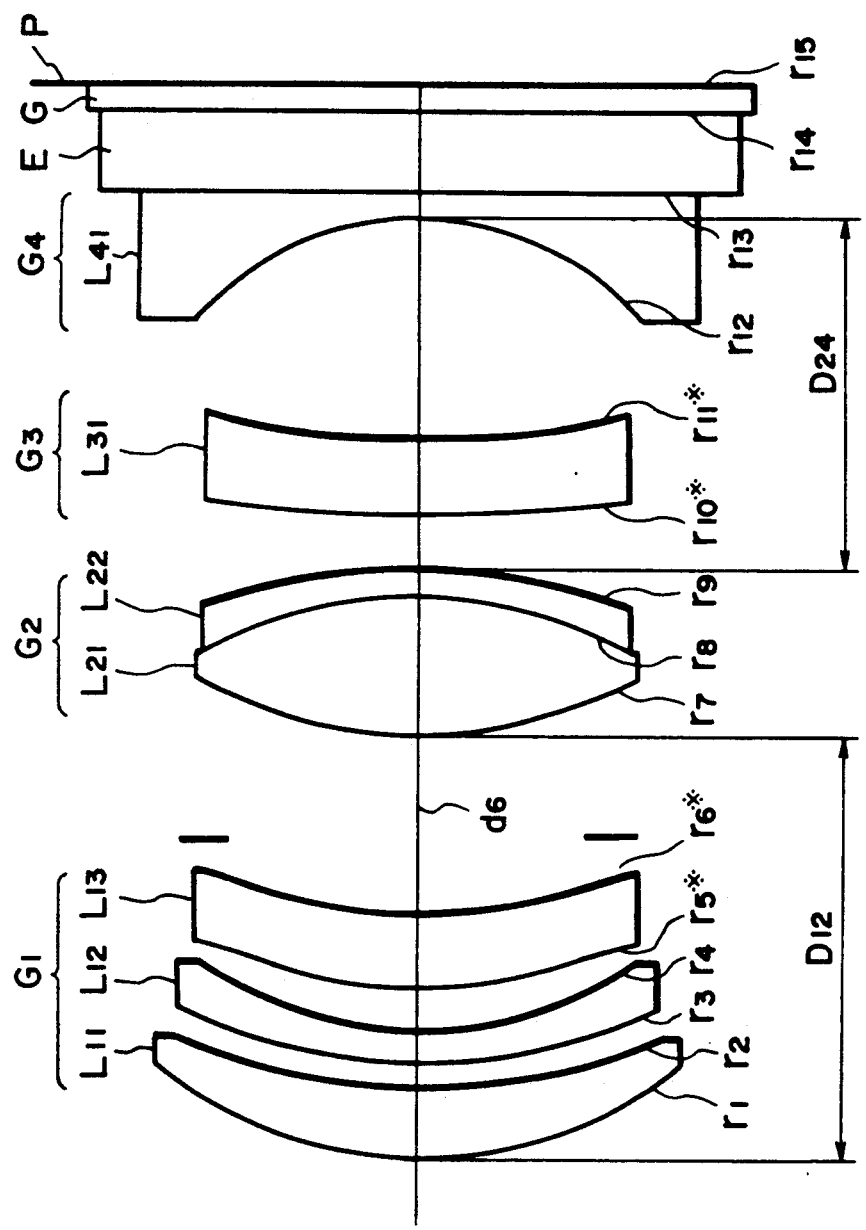
FIG. 7 illustrates the configuration of the lenses for the projecting lens according to a third embodiment of the present invention.

FIGS. 5, 6 and 7 respectively illustrate the structure of each of a first, a second and a third embodiments of the present invention.

A projecting lens according to the first and the second embodiments comprises, when viewed from the screen, a first lens group $G_1$ having positive refracting power and constituted by a positive meniscus lens $L_{11}$ made of glass and the convex side of which faces the screen, a negative meniscus lens $L_{12}$ made of glass and the convex side of which similarly faces the screen and a plastic meniscus lens $L_{13}$ the convex side of which faces the screen. The projecting lens further comprises a second lens group $G_2$ having positive refracting power and comprises a biconvex positive lens $L_{21}$ made of glass and a negative meniscus lens $L_{22}$ joined to the positive lens $L_{21}$ and the convex side of which faces the CRT. In addition, the projecting lens comprises a third lens group $G_3$ having positive refracting power and constituted by a negative meniscus lens $L_{31}$ made of glass and the convex side of which faces the screen and a plastic lens $L_{32}$. Furthermore, the projecting lens comprises a fourth lens group $G_4$ having a negative refracting power and constituted by a negative lens $L_{41}$ made of glass and its side having stronger curvature faces the screen.

An ethylene glycol E provided for the purpose of coupling the projecting lens to the CRT and capable of being optically used as a substantially parallel and flat plate and a flurorescent screen P serving as a screen through which an object is projected are disposed behind the above-described lens groups $G_1$, $G_2$, and $G_4$, the fluorescent screen P being disposed via a substantially parallel and flat CRT front glass G.

The configuration of the lens groups according to the third embodiment shown in FIG. 7 is arranged similarly to that in the first and the second embodiments except for the structure arranged in such a manner that the third lens group $G_3$ is constituted by an aspherical plastic lens $L_{31}$ in the meniscus shape and the convex side of which faces the screen.

The plastic lens disposed in each of the first lens group $G_1$ and the third lens group $G_3$ according to each of the above-described embodiments is arranged in such a manner that each of the two sides thereof are in the form of an aspherical surface. Furthermore, each of the aspherical plastic lenses has weak and positive refracting power in the paraxial region. Therefore, a significantly excellent effect can be obtained in that the change in the focal distance due to the change in the temperature can be countervailed by the back focal change of the overall body of the lens system due to the same temperature change.

As described above, the projecting lens according to the first to the third embodiments comprises, when viewed from the screen, the first lens group $G_1$ having positive refracting power, the second lens group $G_2$ having positive refracting power, the third lens group $G_3$ having positive refracting power and the fourth lens group $G_4$ having negative refracting power. Furthermore, the first lens group $G_1$ and the third lens group $G_3$ respectively have aspherical surfaces. Assuming that the focal distance of the first lens group $G_1$ is $f_{G1}$, that of the third lens group $G_3$ is $f_{G3}$ and that of the overall system is f, the structure is constituted so as to satisfy the following conditions:

$$0 < f/f_{G1} < 0.25 \qquad (1)$$

$$0 < f/f_{G3} < 0.3 \qquad (2)$$

As a result of the above-described basic structure, the first lens group $G_1$ is enabled to have the function capable of correcting the aspherical aberration and the comatic aberration outside the axis. The second lens group $G_2$ has the image forming function, while the third lens group $G_3$ has a function capable of satisfactorily correcting the distortion and the comatic aberration. The fourth lens group $G_4$ has a function capable of correcting the Petzval's sum serving as the field flattener, that is, a function capable of correcting the field curvature and the astigmatism.

In order to have the above-described aberration correction function effected efficiently, it is preferable that one or more aspherical surfaces be provided in the first lens group $G_1$ and the third lens group $G_3$. If the aspherical lens is made of plastic, the cost necessary for the lens work can be significantly reduced. In particular, if the two sides of the aspherical plastic lens are respectively arranged in the form of an aspherical surface, the optical performance can be improved with the reduced number of the lenses.

In order to have the first lens group $G_1$ provided with the function for correcting the spherical aberration and the comatic aberration outside the axis, the first lens group $G_1$ must have the proper refracting power as shown in Equation (1).

If the level of the provided refracting power exceeds the upper limit expressed in Equation (1), the refracting power of the first lens group $G_1$ becomes excessively strong, causing an excessive comatic aberration to be generated. As a result, the wide field angle cannot be realized, and what is even worse, the distortion becomes excessively large toward the positive side. On the contrary, if the refracting power becomes lower than the lower limit expressed in Equation (1), the refracting power of the first lens group $G_1$ becomes a negative value, causing the first lens group $G_2$ having the image forming function must perform an important roll of exhibiting the refracting power. As a result, the spheric aberration cannot be satisfactorily corrected, causing the F-number to be enlarged. Therefore, the necessary quantity of light cannot be obtained, and what is even worse, the size of the lens system must be undesirably enlarged.

In order to satisfactorily correct the distortion and the comatic aberration, the third lens group $G_3$ must have proper refracting power as shown in Equation (2).

If the refracting power given to the third lens group $G_3$ exceeds the upper limit shown in Equation (2), the reflecting power of the fourth lens group $G_4$ must be enlarged for the purpose of satisfactorily maintain the Petzval's sum. The comatic aberration becomes adverse in the flux having a large field height. Furthermore, the warp of the distortion becomes excessively large. If the refracting power becomes lowered than the lower limit shown in Equation (2), the refracting power of the third lens group $G_3$ becomes a negative value, causing the second lens group $G_2$ having the image forming function must perform an important roll of exhibiting the refracting power. As a result, the spheric aberration cannot be satisfactorily corrected.

In order to obtain a satisfactory effect of correction of the aberration from the first lens group $G_1$ and to significantly reduce the cost, it is preferable that the structure be arranged in such a manner that the first lens group $G_1$ comprises, when viewed from the screen, the positive meniscus lens component $L_{11}$ the convex side of which faces the screen, the negative meniscus lens component $L_{12}$ the convex side of which faces the screen and aspherical plastic lens component $L_{13}$ in the meniscus shape and the convex side of which faces the screen. Furthermore, it is preferable that the following relationship be satisfied assuming that the paraxial focal distance of the aspherical plastic lens component $L_{13}$ is $f_{as1}$:

$$0 < f/f_{as1} < 0.25 \tag{3}$$

As described above, it is significantly advantageous to realize an aspherical lens of a reduced cost by manufacturing the lens with plastic. However, a plastic lens is known to have the characteristics that the refraction factor and the shape thereof can be easily changed due to the temperature change. In general, a video projector is usually used in a severe condition in which the temperature is considerably changed. Therefore, a satisfactory temperature compensation performance must be provided in order to maintain the optical performance against the above-described temperature change. Therefore, if the plastic lens is arranged to have weak and positive refracting power, the change in the focal distance of the plastic lens due to the change in the refraction factor and the shape change caused from the temperature change can be satisfactorily balanced by the back focus change of the overall body of the projecting lens also due to the temperature change.

In order to realize the satisfactory temperature compensation at the time of the aberration correction, the aspherical plastic lens must have the reduced refracting power as possible and its shape must be arranged so as to correct the high degree aberrations. Therefore, both the best image surface change and the aberration change due to the temperature change must be satisfactorily balanced.

The above-described Equation (3) defines the proper refracting power of the aspherical plastic lens in the paraxial region. If the refracting power exceeds the region defined by Equation (3), the movement of the image surface, due to the change in the refraction factor and the shape caused from the temperature change, becomes enlarged. If the refracting power exceeds the upper limit shown in Equation (3), the spherical aberration cannot be corrected satisfactorily, and what is even worse, the aberration balance in the comatic aberration may be lost. If the refracting power becomes lowered than the lower limit shown in Equation (3), the spherical aberration may be corrected excessively. In particular, the divergence effect of a diagonal flux becomes enlarged, causing the height at which that diagonal flux passes through the second lens group $G_2$ is raised, causing comatic aberration to be generated excessively.

As described above, when the conditions defined in Equation (3) are met, the undesirable change in the optical performance due to the temperature change can be reduced satisfactorily and the effect of the aspherical surface can thereby be exhibited as desired. As a result, the high-degree spherical aberration and the comatic aberration can be satisfactorily corrected, causing the total optical performance of the projecting lens to be improved.

In order to obtain an excellent correction effect from the third lens group $G_3$ and to reduce the cost assuredly, it is preferably that the structure be arranged in such a manner that the third lens group $G_3$ comprises, when viewed from the screen, the negative meniscus lens component $L_{31}$ the convex side of which faces the screen and the aspherical plastic lens component $L_{32}$ having the biconvex shape in the paraxial region. Furthermore, it is preferable that the following relationship be met assuming that the paraxial focal distance of the aspherical plastic lens component $L_{32}$ is $f_{as3}$:

$$0 < f/f_{as3} < 0.4 \tag{4}$$

When the structure is arranged so as to meet Equation (4), both the aberration change and the change in the best image surface due to the temperature change can be satisfactorily balanced so that the effect of the aspherical surface can be obtained satisfactorily. As a result, a totally excellent optical performance can be obtained similarly to the above-described aspherical plastic lens $L_{13}$ of the first lens group $G_1$.

Furthermore, the proper refracting power of the aspherical plastic lens component $L_{12}$ in the paraxial region is defined in Equation (4). If the refracting power exceeds the range defined in Equation (4), the change in the image surface due to the change in the refraction factor and the shape caused from the temperature change becomes too large. If the refracting power exceeds the upper limit shown in Equation (4), the refracting power of the aspherical plastic lens component $L_{32}$ becomes too large. Therefore, although the effect from the aspherical surface can be obtained satisfactorily, the warp of the high-degree distortion becomes too large. As a result, the comatic aberration cannot be corrected perfectly. If the refracting power becomes lowered than the lower limit shown in Equation (4), the refracting power of the aspherical plastic lens component $L_{32}$ becomes a negative value, causing the necessity for the second lens group $G_2$ having the image function of exhibiting the refracting power to be arisen. Therefore, the spherical aberration becomes adverse. Furthermore, the distortion is corrected excessively and the comatic aberration cannot thereby be corrected easily.

The above-described third lens group $G_3$ may be constituted in such a manner that the portion in the vicinity of the vertex of the lens is in the form of a positive meniscus shape and the third lens group $G_3$ comprises only aspherical plastic lenses the convex side each of which faces the screen. In order to prevent the deterioration in the optical performance due to the temperature change, it is preferable that Equation (4) be met.

The above-described first lens group $G_1$ has the function of satisfactorily correct the spherical aberration and the comatic aberration. In order to improve the correction function of the first lens group $G_1$, to correct the various aberrations of the overall body of the lens system with an excellent balance maintained and to reduce the size of the overall body of the projecting lens, it is preferable that the following relationship be met assuming that the axial distance from the vertex of the lens of the first lens group $G_1$ nearest the screen to the vertex of the lens of the second lens group $G_2$ nearest the screen is $D_{12}$, while the axial distance from the vertex of the lens of the second lens group $G_2$ nearest the CRT and the vertex of the lens of the fourth lens group $G_4$ nearest the screen is $D_{24}$:

$$0.9 < D_{12}/D_{24} < 1.5 \quad (5)$$

If the distance becomes shorter than the lower limit shown in Equation (5), the first lens group $G_1$ comes closer to the second lens group $G_2$. Therefore, the aspherical aberration and the comatic aberration cannot be corrected easily. If the distance becomes longer than the upper limit shown in Equation (5), the overall length of the lens system becomes elongated extremely. Therefore, the size and the weight of the overall lens system becomes too large.

In order to maintain the quantity of light for the projecting lens according to the present invention and to satisfactorily correct the comatic aberration or the like, it is preferable that the following relationship be met assuming that the length of air from the first lens group $G_1$ and the second lens group $G_2$ is $d_6$ and the focal distance of the overall system is f:

$$0.15 < d_6/f < 0.4 \quad (6)$$

If the length is shorter than the lower limit shown in Equation (6), the length of air between the first lens group $G_1$ and the second lens group $G_2$ becomes too small. As a result, the comatic aberration in the sagital direction becomes adverse. Therefore, the correction of the comatic aberration cannot be performed easily. If the same exceeds the upper limit shown in Equation (6), the length of air between the first lens group $G_1$ and the second lens group $G_2$ becomes too widened. Therefore, the peripheral light quantity cannot be easily maintained. In order to overcome this problem, the lens system must be undesirably enlarged. In addition, the height of the diagonal light passing through the second lens group $G_2$ becomes too high at the time of the incidental operation, causing an excessive comatic aberration to be generated.

Although the projecting lens according to the present invention realizes a large magnification, the aberration becomes enlarged in proportion to the enlargement of the magnification of projection. As a result, the chromatic aberration cannot be easily corrected. Therefore, according to the present invention, the second lens group $G_2$ comprises a laminated lens formed by laminating the positive lens $L_{21}$ and the negative lens $L_{22}$ so that the chromatic aberration is satisfactorily corrected.

In this case, in order to improve the color correction effect of the laminated lens, it is preferable that the following relationship be met assuming that the Abbe number with respect to line e ($\lambda = 546.1$ nm) of the positive meniscus lens component $L_{11}$ of the first lens group $G_1$ the convex side of which faces the screen is $\nu$hd 11 and the Abbe number with respect to line e ($\lambda = 546.1$ nm) of the negative meniscus lens component $L_{12}$ of the first lens group $G_1$ the convex side of which faces the screen is $\nu$hd 12:

$$25 < \nu\text{hd } 11 - \nu\text{hd } 12 < 36 \quad (7)$$

If the Abbe number exceeds the range defined by Equation (7), the balance between the chromatic aberration correction by the positive meniscus lens component $L_{11}$ and the negative meniscus lens component $L_{12}$ of the first lens group $G_1$ and the chromatic aberration correction by the laminated lens of the second lens group $G_2$ is undesirably lost. As a result, if the axial chromatic aberration correction is taken preference, the magnification chromatic aberration cannot be corrected easily.

In order to realize an excellent aberration balance as the overall body of the projecting lens, it is preferable that the following relationship be met assuming that the refraction factor of the positive lens $L_{21}$ constituting the laminated lens with respect to line e ($\lambda = 546.1$ nm) and that of the negative lens $L_{22}$ with respect to the same are $n_{21}$ and $n_{22}$ respectively:

$$n_{22} - n_{21} < 0.15 \quad (8)$$

The condition expressed in Equation (8) shows the condition to satisfactorily correct the spherical aberration and the comatic aberration. If the condition defined by Equation (8) is not met, the correction of the outside comatic aberration becomes excessively difficult.

As described above, according to the first and the second embodiments, the aspherical plastic lens is disposed in each of the first lens group $G_1$ and the third lens group $G_3$. Therefore, an excellent advantage in terms of the aberration correction and the manufacturing cost can be obtained. Furthermore, the second lens group $G_2$, having the strongest refracting power in the overall system, that is, the image forming function, is constituted by a glass lens so that the deterioration in performance due to the temperature change is significantly prevented.

Furthermore, the lenses acting to correct the chromatic aberration, that is, the positive meniscus lens $L_{11}$ and the negative meniscus lens $L_{12}$ in the first lens group $G_1$, the biconvex positive lens $L_{21}$ in the second lens group $G_2$ and the negative meniscus lens $L_{22}$ joined to the positive lens $L_{21}$ and the convex side of which faces the CRT are respectively formed by glass lenses. Therefore, an excellent effect can be obtained in that the chromatic aberration cannot be deteriorated due to the temperature change.

Then, specific items of the projecting lens according to the first embodiment are shown in Table 1, where symbols $r_1$, $r_2$, $r_3$, ..., respectively represent the curvature radius of the lens surfaces when viewed from the screen, symbols $d_1$, $d_2$, $d_3$, ..., represent the thickness of the lens centers and intervals between the lenses, symbol n represents the refractive index with respect to the line e ($\lambda = 546.1$ nm) of each of the lenses and $\nu$ represents the Abbe number with respect to the line e ($\lambda = 546.1$ nm). Furthermore, symbols $f_1$, $f_2$ and $f_3$ respectively represent the focal lengths of the lens groups and f represents the focal length of the overall system. Furthermore, assuming that the symbol C represents the curvature of the vertex, k represents the cone constant and $A_2$, $A_4$, $A_6$, $A_8$ and $A_{10}$ represent aspherical surface coefficients in a rectangular coordinates in which X-axis stands for the optical direction, the aspherical surface is a rotation-symmetric aspherical surface expressed by:

$$X = \frac{CP}{1 + \sqrt{1 - kC^2P^2}} +$$

$$A_2P^2 + A_4P^4 + A_6P^6 + A_8P^8 + A_{10}P^8$$

where $P = \sqrt{Y^2 + Z^2}$

Table 1 also shows the values of the above-described factors. In Table 1, symbol * given on the left side of the lens surface number represents the aspherical surface, where the exponent of the cone constant and the aspherical surface coefficient, that is, $10^{-n}$ is expressed as E−n. The above-described symbols are used similarly to the ensuing embodiments.

TABLE 1

(First embodiment)

Focal distance f = 175.4  Aperture ratio 1:1.25
Projecting magnification −28.65  Half field-angle 25.0°

| | r | d | ν | n | |
|---|---|---|---|---|---|
| 1 | 136.255 | 25.70 | 60.1 | 1.62286 | $L_{11}$ |
| 2 | 211.484 | 3.56 | | | |
| 3 | 169.503 | 5.00 | 28.1 | 1.73432 | $L_{12}$ |
| 4 | 112.869 | 9.00 | | | |
| 5 | 116.966 | 30.70 | 57.2 | 1.49354 | $L_{13}$ |
| 6 | 135.009 | 43.60 | | | |
| 7 | 143.609 | 44.00 | 60.1 | 1.62286 | $L_{21}$ |
| 8 | −119.016 | 7.00 | 25.3 | 1.81265 | $L_{22}$ |
| 9 | −179.411 | 6.00 | | | |
| 10 | 135.400 | 10.00 | 28.1 | 1.73432 | $L_{31}$ |
| 11 | 112.605 | 22.50 | | | |
| 12 | 562.170 | 22.00 | 57.2 | 1.49354 | $L_{32}$ |
| 13 | −642.000 | 39.74 | | | |
| 14 | −80.551 | 7.00 | 36.1 | 1.62409 | $L_{41}$ |
| 15 | ∞ | 21.00 | 56.3 | 1.43490 | S |
| 16 | ∞ | 7.00 | 51.3 | 1.53604 | G |
| 17 | ∞ | | | | |

Fifth surface (aspherical surface)
cone constant K = 0
aspherical coefficient
  $A_2 = 0, A_4 = -0.2251E - 07$
  $A_6 = 0.1125E - 10, A_8 = -0.7886E - 14$
  $A_{10} = 0.6228E - 18$
Sixth surface (aspherical surface)
cone constant K = 0.8527
aspherical coefficient
  $A_2 = 0, A_4 = 0.4705E - 07$
  $A_6 = 0.1871E - 10, A_8 = -0.9903E - 14$
  $A_{10} = 0.1054E - 17$
Twelfth surface (aspherical surface)
cone constant K = −9.9
aspherical coefficient
  $A_2 = 0, A_4 = -0.7093E - 08$
  $A_6 = -0.3989E - 11, A_8 = -0.8666E - 14$
  $A_{10} = 0.7785E - 19$
Thirteenth surface (aspherical surface)
cone constant K = 48.68
aspherical coefficient
  $A_2 = 0, A_4 = 0.9387E - 07$
  $A_6 = -0.2129E - 10, A_8 = -0.2330E - 14$
  $A_{10} = 0.3893E - 19$ The surface of the aspherical plastic lens $L_{13}$ of the first lens group $G_1$ according to the first embodiment and having the meniscus shape is arranged in such a manner that its lens surface confronting the screen has a shape having the positive plane refracting power which is gradually weakened from the optical axis toward the peripheral portion. The lens surface of the plastic lens $L_{13}$ confronting the CRT is arranged in such a manner that its negative plane refracting power is gradually strengthened from the optical axis toward the peripheral portion. As a result, high-degree spherical aberration and comatic aberration which cannot be perfectly corrected by the two, positive and the negative, glass meniscus lenses $L_1$ and $L_{12}$ confronting the screen can be satisfactorily corrected.

The aspherical plastic lens $L_{32}$ in the third lens group $G_3$ is in the form of a biconvex shape in the paraxial region, while it is in a hat-like shape in the peripheral portion arranged in such a manner that the shape in the paraxial portion is in the form of a biconvex shape and that in the two peripheral portions is curved toward the screen. The surface of the aspherical plastic lens $L_{32}$ confronting the screen is specially arranged in such a manner that the positive plane refracting power is gradually weakened from the optical axis to the peripheral portion and the positive plane refracting power is rapidly weakened in the peripheral portion. Furthermore, the peripheral portion of the plastic lens $L_{32}$ confronting the CRT has an inflection point at which the effect of the plane refracting power is inverted. That is, its shape is arranged in such a manner that the positive plane refracting power is gradually weakened from the optical axis toward the peripheral portion, while the positive plane refracting power is, on the contrary, strengthened when comes closer to the peripheral portion. As a result, the function of correcting the high-degree distortion and the comatic aberration is satisfactorily exhibited.

The plane refracting power according to this embodiment is defined as follows: the difference between the incidental angle and an emission angle of an optional light beam made incident upon an optional point of a refractive surface, that is, the deflection angle is defined to be a plane refracting power of a fine surface. In addition, the plane refracting power of the plane is defined to be the positive plane refracting power when parallel beams made incident upon the portion in the vicinity of the refractive point are converted after the refraction. Furthermore, when it diverges after the refraction, the refracting power of the subject plane is defined to be the negative plane refracting power.

A projecting lens according to the second embodiment is, as shown in FIG. 6, basically structured similarly to the above-described first embodiment. However, the projecting magnification of the projecting lens is arranged to be about 18.5 times.

Each of the aspherical plastic lenses $L_{13}$ and $L_{32}$ disposed in the first and the third lens groups $G_1$ and $G_3$ have, similarly to those according to the first embodiment, has the aspherical surface. In particular, the aspherical surface of the aspherical plastic lens $L_{13}$ of the first lens group $G_1$ confronting the CRT is, in comparison to the first embodiment, arranged in such a manner that the negative refracting power is gradually strengthened from the optical axis toward the peripheral portion. Furthermore, the amount of the displacement from the reference spherical surface becomes the maximum value at the position at which the height from the optical axis becomes about 70% of the effective radius (half of the effective diameter).

The specific items according to the second embodiment is shown in Table 2.

TABLE 2

(Second embodiment)

Focal distance f = 171.3  Aperture ratio 1:1.25
Projecting magnification −18.51  Half field-angle 24.8°

| | r | d | ν | n | |
|---|---|---|---|---|---|
| 1 | 126.944 | 25.70 | 60.1 | 1.62286 | $L_{11}$ |
| 2 | 209.934 | 2.50 | | | |
| 3 | 164.885 | 5.00 | 28.1 | 1.73432 | $L_{12}$ |
| 4 | 109.110 | 9.20 | | | |
| 5 | 128.000 | 30.70 | 57.2 | 1.49354 | $L_{13}$ |
| 6 | 138.610 | 43.40 | | | |
| 7 | 140.352 | 44.00 | 60.1 | 1.62286 | $L_{21}$ |
| 8 | −118.003 | 7.00 | 25.3 | 1.81265 | $L_{22}$ |
| 9 | −182.421 | 6.00 | | | |
| 10 | 130.036 | 10.00 | 28.1 | 1.73432 | $L_{31}$ |
| 11 | 109.807 | 22.50 | | | |
| 12 | 562.170 | 22.00 | 57.2 | 1.49354 | $L_{32}$ |

TABLE 2-continued (Second embodiment)

| | | | | | |
|---|---|---|---|---|---|
| 13 | −642.000 | 40.80 | | | |
| 14 | −80.551 | 7.00 | 36.1 | 1.62409 | $L_{41}$ |
| 15 | ∞ | 21.00 | 56.3 | 1.43490 | S |
| 16 | ∞ | 7.00 | 51.3 | 1.53604 | G |
| 17 | ∞ | | | | |

Fifth surface (aspherical surface)
cone constant K = 0
aspherical coefficient
  $A_2 = 0$, $A_4 = -0.6881E - 07$
  $A_6 = 0.8922E - 11$, $A_8 = -0.7087E - 14$
  $A_{10} = 0.6228E - 18$
Sixth surface (aspherical surface)
cone constant K = 0.8527
aspherical coefficient
  $A_2 = 0$, $A_4 = 0.3704E - 08$
  $A_6 = 0.1841E - 10$, $A_8 = -0.8949E - 14$
  $A_{10} = 0.1054E - 17$
Twelfth surface (aspherical surface)
cone constant K = −9.9
aspherical coefficient
  $A_2 = 0$, $A_4 = -0.2981E - 07$
  $A_6 = -0.5990E - 11$, $A_8 = -0.9702E - 14$
  $A_{10} = 0.7785E - 19$
Thirteenth surface (aspherical surface)
cone constant K = 48.68
aspherical coefficient
  $A_2 = 0$, $A_4 = 0.8373E - 07$
  $A_6 = -0.2721E - 10$, $A_8 = -0.1961E - 14$
  $A_{10} = 0.3893E - 19$ The projecting lens according to the third embodiment is, as shown in FIG. 7, arranged in such a manner that the first, the second and the third lens groups $G_1$, $G_2$ and $G_4$ are basically arranged to be the same as those according to the above-described first embodiment. However, the third lens group $G_3$ is arranged so as to be constituted by only the aspherical plastic lens of the meniscus shape the convex side of which faces the screen.

According to the third embodiment, the aspherical surface of each of the plastic lenses in the first and the third lens groups $G_1$ and $G_e$ is arranged in such a manner that the amount of the displacement from the reference spherical surface in the peripheral portion is relatively enlarged so that the effect obtainable from the aspherical surface can be extremely improved. Specifically, the amount of the displacement from the reference spherical surface in the peripheral portion of the aspherical surface of the aspherical plastic lens $L_{13}$ of the first lens group $G_1$ confronting the screen is enlarged so that the positive refracting power is rapidly weakened. On the other hand, the aspherical surface of the same confronting the CRT is, different from the first and the second embodiments, arranged in such a manner that the negative plane refracting power is gradually weakened from the optical axis toward the peripheral portion.

The aspherical surface of the aspherical plastic lens $L_{31}$ of the third lens group $G_3$ confronting the screen is arranged in such a manner that the positive plane refracting power is gradually weakened from the optical axis toward the peripheral portion. On the other hand, the aspherical surface of the same confronting the CRT is arranged in such a manner that the negative plane refracting power is strengthened from the optical axis toward the peripheral portion.

TABLE 3

(Third embodiment)

Focal distance f = 171.6  Aperture ratio 1:1.24
Projecting magnification −18.58  Half field-angle 24.7°

| | r | d | ν | n | |
|---|---|---|---|---|---|
| 1 | 108.163 | 20.00 | 61.0 | 1.59142 | $L_{11}$ |
| 2 | 173.737 | 6.00 | | | |
| 3 | 147.609 | 8.50 | 26.3 | 1.76859 | $L_{12}$ |
| 4 | 98.473 | 12.60 | | | |
| 5 | 113.000 | 20.00 | 57.2 | 1.49354 | $L_{13}$ |
| 6 | 136.000 | 47.40 | | | |
| 7 | 122.785 | 38.00 | 61.0 | 1.59142 | $L_{21}$ |
| 8 | −116.908 | 7.00 | 25.5 | 1.79193 | $L_{22}$ |
| 9 | −185.583 | 15.00 | | | |
| 10 | 790.000 | 20.00 | 57.2 | 1.49354 | $L_{31}$ |
| 11 | 800.000 | 58.80 | | | |
| 12 | −80.551 | 7.00 | 36.1 | 1.62409 | $L_{41}$ |
| 13 | ∞ | 21.00 | 56.3 | 1.43490 | S |
| 14 | ∞ | 7.00 | 51.3 | 1.53604 | G |
| 15 | ∞ | | | | |

Fifth surface (aspherical surface)
cone constant K = 1
aspherical coefficient
  $A_2 = 0$, $A_4 = -0.2231E - 06$
  $A_6 = -0.2793E - 10$, $A_8 = -0.7227E - 14$
  $A_{10} = 0.9000E - 18$
Sixth surface (aspherical surface)
cone constant K = 1
aspherical coefficient
  $A_2 = 0$, $A_4 = -0.9316E - 07$
  $A_6 = -0.2833E - 10$, $A_8 = -0.4056E - 14$
  $A_{10} = 0.1000E - 17$
Tenth surface (aspherical surface)
cone constant K = −2
aspherical coefficient
  $A_2 = 0$, $A_4 = 0.1781E - 06$
  $A_6 = -0.7941E - 11$, $A_8 = 0.2876E - 15$
  $A_{10} = -0.7000E - 18$
Eleventh surface (aspherical surface)
cone constant K = 2
aspherical coefficient
  $A_2 = 0$, $A_4 = 0.3784E - 06$
  $A_6 = -0.2058E - 11$, $A_8 = 0.6466E - 14$
  $A_{10} = -0.4000E - 18$ Then, the numerical data corresponding to the conditions according to the above-described embodiments of the present invention is shown in Table 4.

TABLE 4

(Conditional numerals)

| Conditions According to the present invention | Embodiments | | |
|---|---|---|---|
| | 1 | 2 | 3 |
| $f/f_{G1}$ | 0.130 | 0.126 | 0.176 |
| $f/f_{G3}$ | 0.129 | 0.139 | 0.002 |
| $f/f_{as1}$ | 0.154 | 0.107 | 0.163 |
| $f/f_{as3}$ | 0.287 | 0.284 | 0.002 |
| $D_{12}/D_{24}$ | 1.181 | 1.150 | 1.231 |
| $d_6/f$ | 0.247 | 0.253 | 0.276 |
| $\nu_{11}-\nu_{12}$ | 32.0 | 32.0 | 34.7 |
| $n_{22}-n_{21}$ | 0.190 | 0.190 | 0.201 |

It is preferable that the focusing of the projecting lens according to the present invention be performed by the inner focusing method.

In the case where the projection magnification is enlarged because the distance from the first lens surface of the projecting lens to the screen is lengthened, the positive meniscus lens $L_{11}$ of the first lens group $G_1$ nearest the screen and the negative lens $L_{41}$ of the fourth lens group $G_4$ nearest the CRT (object to be projected) and having a strong concave surface at its side confronting the screen are fixed. Furthermore, the negative meniscus lens $L_{12}$ of the first lens group $G_1$, the second lens group G₂ and the third lens group G₃ are integrally moved along the optical axis so that the focusing is realized.

In the case where the projection magnification is reduced because the first lens surface of the projecting lens and the screen is shortened, the two, positive and the negative meniscus lenses $L_{11}$ and $L_{12}$ (the synthesized refracting power is positive) made of glass of the first lens group $G_1$ and the negative lens $L_{41}$ of the fourth lens group $G_4$ nearest the CRT and having a strong concave surface at its side confronting the screen are fixed. Furthermore, the aspherical plastic lens $L_{13}$ of the first lens group $G_1$, the second lens group $G_2$ and the third lens group $G_3$ are integrally moved along the optical axis so that the focusing is realized.

The third embodiment may be arranged in such a manner that the first lens group $G_1$ to the third lens group $G_3$ are integrally moved along the optical axis toward the screen so that the focusing can be performed with an excellent aberration balance maintained.

When the focusing is performed, the structure is arranged in such a manner that the two, the positive and the negative meniscus lenses $L_{11}$ and $L_{12}$ (the synthesized refracting power is positive), made of glass, of the first lens group $G_1$ and the negative lens $L_{41}$ of the fourth lens group $G_4$ nearest the CRT and the strong concave surface of which confronts the screen are fixed. Furthermore, the second lens group $G_2$ and the third lens group $G_3$ are integrally moved along the optical axis, and simultaneously but independently from the above-described movements, the aspherical plastic lens $L_{13}$ of the first lens group $G_1$ is moved along the optical axis. As a result, the warp of the image surface projected on the screen can be extremely satisfactorily corrected without the fear of the deterioration in the spherical aberration.

Figure 8:
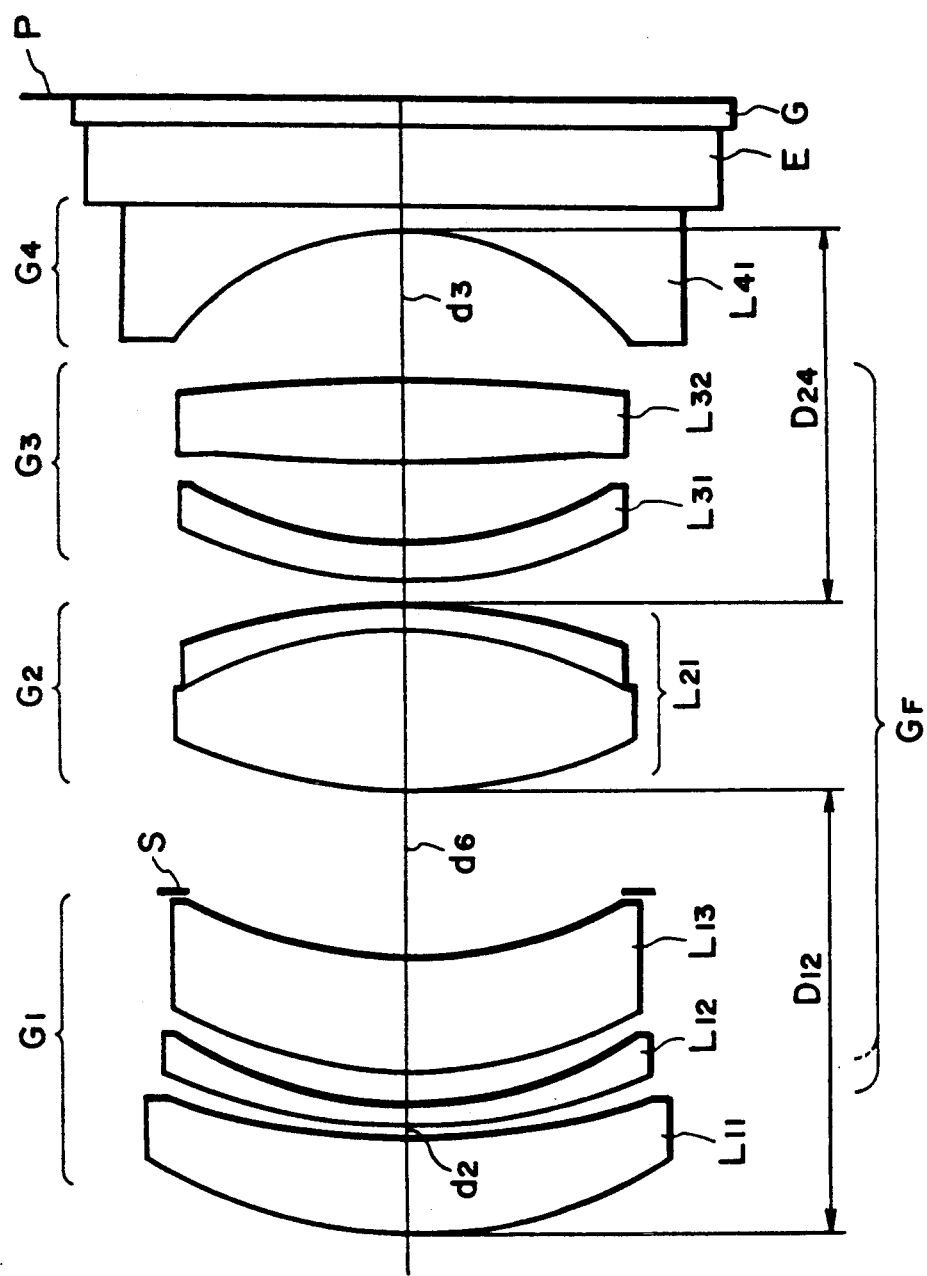
FIG. 8 illustrates the configuration of the lenses for the projecting lens according to a fourth and a fifth embodiments of the present invention.
Figure 9:
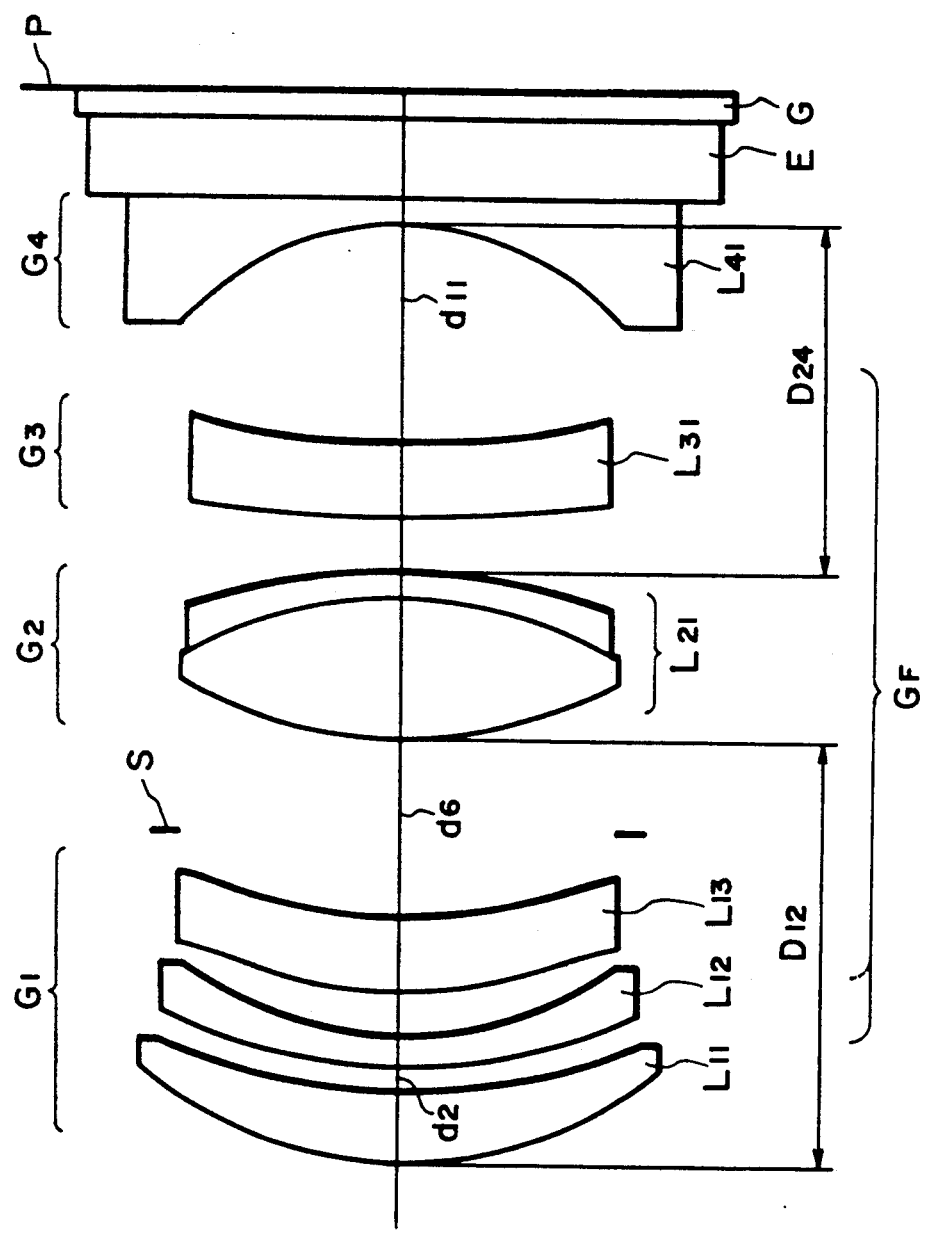
FIG. 9 illustrates the configuration of the lenses for the projecting lens according to a sixth embodiment of the present invention.

Then, an embodiment of the inner focusing type projecting lens according to the present invention will be described with reference to FIGS. 8 and 9. FIG. 8 illustrates the configuration of the lenses according to the fourth and the fifth embodiments of the present invention. FIG. 9 illustrates the configuration of the lenses according to a sixth embodiment.

Each of the projecting lens shown in FIGS. 8 and 9 employs the inner focusing method arranged in such a manner that the front lens component and the rear lens component fixed and the plurality of the lenses between the above-described fixed lens groups are moved along the optical axis. As a result, an excellent quality image can be formed by the projection on the screen even if the size of the screen is different.

The projecting lens for a video projection comprises a movable lens group capable of moving along the optical axis for the purpose of performing the focusing and front fixed-lens unit fixed on the optical axis more adjacent to the screen with respect to the above-described movable lens group, the front fixed-lens unit having positive refracting power. The projecting lens further comprises a rear fixed-lens unit fixed on the optical axis more adjacent to the object to be projected with respect to the above-described movable lens group, the rear fixed-lens unit having negative refracting power. In this case, in order to obtain an excellent image forming performance by restricting the movement of the image surface at the time of the focusing, the distribution of the refracting power of the movable lens group must be made properly.

Therefore, the above-described movable lens group is constituted so as to meet the following conditions assuming that the focal distance of the overall system is f and the focal distance of the movable lens group is $f_F$:

$$0.8 < \frac{f_F}{f} < 1.1 \quad (9)$$

If the condition exceeds the upper limit shown in Equation (9), the refracting power of the movable lens group becomes weakened, causing the amount of the movement of the movable lens group to become excessively long at the time of the focusing. Therefore, the change in the curvature of the image surface is enlarged excessively with respect to the axial movement of the best image surface due to the change in the spherical aberration. In particular, the curvature of the image surface in the peripheral portion of the projected image is enlarged, causing the image forming performance to be excessively deteriorated. Furthermore, since the amount of the movement of the movable lens group at the time of the focusing is enlarged, a larger air interval must be secured between the front fixed-lens unit and the movable lens group. Therefore, the size of the lens system is undesirably enlarged.

On the other hand, if the condition is lowered than the lower limit shown in Equation (9), the refracting power of the movable lens group becomes too large, causing the spherical aberration and the comatic aberration to be excessively changed at the time of the focusing. As a result, the image forming performance is deteriorated.

In order to obtain excellent image forming performance also at the focusing with realizing a projecting lens of a large aperture, a wide angle and large magnification, it is preferable that the structure be arranged in such a manner that the projecting lens is basically constituted by four groups, that is, positive, positive, positive and negative groups and the inner focusing method according to the present invention is employed.

The inner focusing type projecting lens shown in FIGS. 8 and 9 comprises, similarly to the first to the third embodiments, when viewed from the screen, the first lens group $G_1$ having positive refracting power, the second lens group $G_2$ having positive refracting power, the third lens group $G_3$ having positive refracting power and the fourth lens group $G_4$ having negative refracting power. Furthermore, the first lens group $G_1$ and the third lens group $G_3$ respectively have an aspherical surface. In addition, the above-described conditions expressed by Equations (1) and (2) are met assuming that the focal distance of the first lens group $G_1$ is $f_{G1}$, the focal distance of the third lens group $G_3$ is $f_{F3}$ and the focal distance of the overall system is f.

As a result of the above-described four group configuration, the first lens group $G_1$ has a function of correcting the spherical aberration and the comatic aberration outside the axis. The second lens group $G_2$ mainly has an image forming function, while the third lens group $G_3$ has a function of satisfactorily correcting distortion and comatic aberration. The fourth lens group $G_4$ has a function of correcting the Petzval's sum serving as the field flattener, that is, the image surface curvature and the aspherical aberration.

In order to make the first lens group $G_1$ satisfactorily exhibit the function of correcting the spherical aberration and the comatic aberration outside the axis, the first lens group $G_1$ must have proper refracting power expressed in Equation (1).

If the condition exceeds the upper limit of the condition expressed in Equation (1), the refracting power of the first lens group $G_1$ becomes excessively large similarly to the above-described first to the third embodiments, causing an excessive large comatic aberration to be generated. As a result, a wide angle projecting lens cannot be realized, and what is even worse, the distortion becomes enlarged toward the positive value. If the condition is lowered than the lower limit shown in Equation (1), the refracting power of the first lens group $G_1$ becomes a negative value. As a result, the second lens group $G_2$ having the image forming function must exhibit the refracting power. Therefore, the correction of the spherical aberration cannot be performed easily. Therefore, the F-number is enlarged and the quantity of light cannot be secured. Furthermore, the size of the lens system is undesirably enlarged.

In order to satisfactorily correct the distortion and the comatic aberration, the third lens group $G_3$ contributing to the above-described aberration correction must have proper refracting power as expressed in Equation (2).

If the refracting power exceeds the upper limit expressed in Equation (2), the refracting power of the third lens group $G_3$ is enlarged similarly to the first to the third embodiments. As a result, the refracting power of the fourth lens group $G_4$ must be strengthened in order to satisfactorily secure the Petzval's sum. Therefore, the comatic aberration of the flux having large image height becomes adverse, and what is even worse, the warp of the distortion is undesirably enlarged. If the refracting power is lowered than the lower limit expressed in Equation (2), the refracting power of the third lens group $G_3$ becomes a negative value. As a result, the second lens group $G_2$ having the image forming function must exhibit the refracting power. Therefore, a satisfactory correction of the spherical aberration cannot be performed.

In order to obtain an excellent effect of correcting the aberration of each of the lens groups and to satisfactorily secure the Petzval's sum for the purpose of correcting the field curvature which is a factor which generates the image surface change in the focusing, the structure is constituted in such a manner that the first lens group $G_1$ comprises, when viewed from the screen, the positive meniscus lens $L_{11}$ the convex side of which faces the screen. The first lens group $G_1$ further comprises the negative meniscus lens $L_{12}$ the convex side of which faces the screen and the aspherical lens $L_{13}$ in the positive meniscus shape and the convex side of which faces the screen. The second lens group $G_2$ comprises, when viewed from the screen, the laminated lens $L_{21}$ formed by joining the biconvex positive lens and the negative lens the concave side of which faces the screen. The third lens group $G_3$ comprises, as shown in FIG. 8 and when viewed from the screen, the negative meniscus lens $L_{31}$ the convex side of which faces the screen, the aspherical and biconvex plastic lens $L_{32}$ and the aspherical lens $L_{31}$ in the meniscus shape as shown in FIG. 9. The fourth lens group $G_4$ comprises the negative lens $L_{41}$ the concave side of which faces the screen.

In this case, it is preferable that the focusing be performed in such a manner that at least the positive meniscus lens $L_{11}$ (the front fixed-lens unit) of the first lens group $G_1$ nearest the object and the negative lens $L_{41}$ (the rear fixed-lens unit) of the fourth lens group $G_4$ nearest the CRT are fixed so as to be integrally moved in the direction of the optical axis.

Another structure may be employed in which the third lens group $G_3$ is constituted by only the negative meniscus plastic lens component $L_{31}$ the convex side of which faces the screen.

In order to realize a low cost and aspherical lens, it is extremely advantageous that the lens is made of plastic. However, a plastic lens has characteristics that its refraction factor and shape are considerably changed due to the temperature change. Therefore, the temperature compensation is necessary in order to prevent the deterioration in the optical performance due to the temperature change in the case of the inner focusing type projecting lens.

Accordingly, when the plastic lens is, similarly to the first to the third embodiments, given weak and positive refracting power, the undesirable change in the focal distance of the plastic lens due to the change in the refracting power and the shape caused from the temperature change can be extremely satisfactorily balanced by the back focus change of the overall body of the projecting lens due to the same temperature change. Furthermore, it is preferable in order to compensate the temperature that the aspherical plastic lens is not given the refracting power as possible and the shape be constituted so as to mainly correct the high-degree aberrations. Therefore, it is necessary to satisfactorily balance both the best image surface change and the aberration change due to the temperature change.

Therefore, the structure is arranged in such a manner that the above-described conditions expressed in Equations (3) and (4) are met assuming that the paraxial focal distance of the aspherical plastic lens of the first lens group $G_1$ is $f_{AS1}$ and the paraxial focal distance of the aspherical plastic lens of the third lens group $G_3$ is $f_{AS3}$. The conditions expressed in Equation (3) are the conditions which define the proper refracting power in the paraxial region of the aspherical plastic lens component $L_{13}$. If the refracting power exceeds the range shown in Equation (3), the image surface change becomes excessively large due to the change in the refractive index and the shape of the plastic lens caused from the temperature change. In particular, a critical deterioration in the image quality arises due to the image surface movement due to the focusing.

Similarly to the aspherical lens $L_{13}$ of the first lens group $G_1$, the conditions expressed in Equation (4) are the conditions for obtaining totally excellent optical performance by satisfactorily balancing the aberration change and the best image surface change due to the temperature change so as to make the effect from the aspherical surface exhibit significantly.

If the conditions exceed the range defined in Equation (4), the image surface change becomes excessively large due to the change in the refractive index and the shape of the plastic lens due to the temperature change. In particular, a critical deterioration in the image forming performance arises due to the focusing.

In order to make the function of correcting the spherical aberration and the comatic aberration of the first lens group $G_1$ exhibit satisfactorily, to satisfactorily balance the various aberrations of the overall body of the lens system and to reduce the size of the overall body of the projecting lens, it is preferable that the above-described conditions expressed in Equation (5) be met.

In order to satisfactorily correct the comatic aberration or the like with maintaining a sufficient light quantity of the inner-focusing type projecting lens, it is preferable that the above-described conditions expressed in Equation (6) be met.

When the magnification of the projecting lens is enlarged, the projecting magnification is enlarged. Therefore, a problem arises in that the aberration is proportionally enlarged, causing a difficulty in correcting the chromatic aberration to be arisen.

Therefore, according to the structures shown in FIGS. 8 and 9, the laminated positive lens component $L_{21}$ is disposed in the second lens group $G_2$, the laminated positive lens component $L_{21}$ being formed by coupling a biconvex positive lens and a negative meniscus lens the convex side of which faces the screen for the purpose of satisfactorily correct the above-described chromatic aberration.

It is preferable that the conditions expressed in Equation (8) be met assuming that the refractive index of the biconvex positive lens $L_{21}$ and the negative meniscus lens $L_{22}$ the concave side of which faces the screen with respect to the line e ($\lambda = 546.1$ nm) are $n_{21}$ and $n_{22}$, respectively, the positive lens $L_{21}$ and the negative meniscus lens $L_{22}$ constituting the laminated lens disposed in the second lens group $G_2$.

Furthermore, in order to make the color correction effect of the laminated lens exhibit satisfactorily, it is preferable that the above-described conditions expressed in Equation (7) be met.

Each of the inner focusing-type projecting lens according to the fourth and the fifth embodiments comprises, as shown in FIG. 8 and when viewed from the screen, the first lens group $G_1$ having positive refracting power and constituted by the positive meniscus lens $L_{11}$ made of glass and the convex side of which faces the screen, the negative meniscus lens $L_{12}$ the convex side of which similarly faces the screen and the plastic lens $L_{13}$ in the form of a meniscus shape and the convex side of which faces the screen. Furthermore, the projecting lens according to this embodiment comprise the second lens group $G_2$ having positive refracting power and constituted by the laminated lens $L_{21}$ formed by coupling the biconvex positive lens made of glass and the negative meniscus lens made of glass and the convex side of which faces the CRT, the negative meniscus lens being coupled to the above-described positive lens. In addition, the projecting lens according to this embodiment comprises the third lens group $G_3$ having positive refracting power and constituted by the negative meniscus lens $L_{31}$ made of glass and the convex side of which faces the screen and the plastic lens $L_{32}$. The projecting lens according to this embodiment further comprises the fourth lens group $G_4$ constituted by the negative lens $L_{41}$ made of glass and the strong curvature side of which faces the screen.

An ethylene glycol E provided for the purpose of coupling the projecting lens to the CRT and capable of being optically used as a substantially parallel and flat plate and a fluorescent screen P serving as a screen through which an object is projected are disposed behind the above-described lens groups $G_1$, $G_2$, $G_3$ and $G_4$, the fluorescent screen P being disposed via a substantially parallel and flat CRT front glass G.

The plastic lenses $L_{13}$ and $L_{32}$ disposed in the first and the third lens group $G_1$ and $G_3$ according to the fourth and the fifth embodiments shown in FIG. 8 are in the form of the double-side aspherical shape.

FIG. 9 illustrates the lens configuration according to the sixth embodiment of the present invention. According to this embodiment, the lens configuration is basically arranged similarly to that according to the fourth and the fifth embodiments. However, the third lens group $G_3$ is, similarly to the third embodiment shown in FIG. 7, constituted by the aspherical lens $L_{31}$ in the form of the meniscus shape the convex side of which faces the screen.

When the focusing is performed in the above-described basic structure, the positive meniscus lens $L_{11}$ (the front fixed-lens unit) of the first lens group $G_1$ which is disposed nearest the screen and the convex side of which faces the screen and the negative lens L (the rear fixed-lens unit) of the fourth lens group $G_4$, which is disposed nearest the CRT and the strong curvature surface of which faces the screen, are fixed. Furthermore, the movable lens group ($L_{12}$ to $L_{31}$) constituted by a plurality of lenses disposed between the above-described fixed lenses are integrally moved in the direction of the optical axis. However, a diaphragm S is disposed between the first lens group $G_1$ and the second lens group $G_2$ so that the diaphragm S is, integrally with the movable lens group ($L_{12}$ to $L_{31}$), moved in the direction of the optical axis with the space, to be throttled, maintained uniformly at the time of the focusing.

Since each of the aspherical plastic lenses has, similarly to the first and the second embodiments, weak and positive refracting power in the paraxial region, an extremely advantageous effect can be obtained in that the change in the focal distance due to the temperature change can be countervailed by the back focus change of the overall body of the lens system due to the same temperature change. Therefore, the image forming performance can be maintained against the temperature change.

As describe above, since the aspherical plastic lens is respectively disposed in the first and the third lens groups $G_1$ and $G_3$, an excellent effect can be obtained in terms of the efficient correction of the aberrations and in terms of reducing the manufacturing cost. In addition, since the second lens group $G_2$ having the strongest refracting power, that is, having the image forming function is made of a glass lens, the deterioration in the performance due to the temperature change can be prevented satisfactorily.

Furthermore, all of the positive meniscus lens $L_{11}$, the negative meniscus lens $L_{12}$ of the first lens group acting to correct the chromatic aberration and the laminated positive lens $L_{21}$ of the second lens group $G_2$, formed by coupling the biconvex positive lens and the negative meniscus lens coupled to the biconvex positive lens, are made of glass. Therefore, an extremely advantageous effect can be obtained in that the deterioration in the chromatic aberration can be prevented against the temperature change.

The specific items of the fourth embodiment are shown in Table 5, where symbols $r_1$, $r_2$, $r_3$, ..., respectively represent the curvature radius of the lens surfaces when viewed from the screen, symbols $d_1$, $d_2$, $d_3$, ..., represent the thickness of the lens centers and intervals between the lenses, symbol n represents the refractive index with respect to the line e ($\lambda = 546.1$ nm) of each of the lenses and $\nu$ represents the Abbe number with respect to the line e ($\lambda = 546.1$ nm). Furthermore, symbol f represents the focal length of the overall system, while M represents the projecting magnification and d represents the distance from the screen to the first surface of the projecting lens. Symbol $d_S$ represents the distance from the sixth surface to the diaphragm. Furthermore, assuming that the symbol C represents the curvature of the vertex, k represents the cone constant and $A_2$, $A_4$, $A_6$, $A_8$ and $A_{10}$ represent aspherical surface coefficients in a rectangular coordinates in which X-axis stands for the optical direction, the aspherical surface is a rotation-symmetric aspherical surface expressed by:

$$X = \frac{CP}{1 + \sqrt{1 - kC^2P^2}} + A_2P^2 + A_4P^4 + A_6P^6 + A_8P^8 + A_{10}P^8$$

where $P = \sqrt{Y^2 + Z^2}$

Table 5 also shows the values of the above-described factors. In Table 5, symbol given on the left side of the lens surface number represents the aspherical surface, where the exponent of the cone constant and the aspherical surface coefficient, that is, $10^{-n}$ is expressed as $E-n$. The above-described symbols are used similarly to the ensuing embodiments.

TABLE 5

(Fourth embodiment)

Focal distance f = 175.58
Aperture ratio 1:1.25  Half field-angle 25.0°

| | r | d | ν | n | |
|---|---|---|---|---|---|
| 1 | 127.725 | 25.00 | 60.1 | 1.62286 | $L_{11}$ |
| 2 | 210.209 | 4.30 | | | |
| 3 | 164.885 | 5.00 | 28.1 | 1.73432 | $L_{12}$ |
| 4 | 109.110 | 9.20 | | | |
| 5 | 128.000 | 30.70 | 57.2 | 1.49354 | $L_{13}$ |
| 6 | 138.610 | 43.40 | | | |
| 7 | 140.352 | 44.00 | 60.1 | 1.62286 | $L_{21}$ |
| 8 | −118.003 | 7.00 | 25.3 | 1.81265 | |
| 9 | −182.421 | 6.00 | | | |
| 10 | 130.036 | 10.00 | 28.1 | 1.73432 | $L_{31}$ |
| 11 | 109.807 | 22.50 | | | |
| 12 | 562.170 | 22.00 | 57.2 | 1.49354 | $L_{32}$ |
| 13 | −642.000 | 39.00 | | | |
| 14 | −80.551 | 7.00 | 36.1 | 1.62409 | $L_{41}$ |
| 15 | ∞ | 21.00 | 56.3 | 1.43490 | E |
| 16 | ∞ | 7.00 | 51.3 | 1.53604 | G |
| 17 | ∞ | | | | |

Fifth surface (aspherical surface)
cone constant: k = 0
aspherical coefficient:
  $A_2 = 0$, $A_4 = -0.6745E - 07$
  $A_6 = 0.8949E - 11$, $A_8 = -0.7054E - 14$
  $A_{10} = 0.6228E - 18$
Sixth surface (aspherical surface)
cone constant: k = 0.8527
aspherical coefficient:
  $A_2 = 0$, $A_4 = 0.2391E - 08$
  $A_6 = 0.1816E - 10$, $A_8 = -0.8810E - 14$
  $A_{10} = 0.1054E - 17$
Twelfth surface (aspherical surface)
cone constant: k = −0.9900E + 01
aspherical coefficient:
  $A_2 = 0$, $A_4 = -0.9882E - 08$
  $A_6 = -0.1060E - 11$, $A_8 = -0.8317E - 14$
  $A_{10} = 0.7785E - 19$
Thirteenth surface (aspherical surface)
cone constant: k = 0.4868E + 02
aspherical coefficient:
  $A_2 = 0$, $A_4 = 0.1002E - 06$
  $A_6 = -0.2191E - 10$, $A_8 = -0.4955E - 15$
  $A_{10} = 0.3893E - 19$ $d_s = 14.400$

| Screen size (inch) | M | $d_0$ | $d_2$ | $d_{13}$ |
|---|---|---|---|---|
| 150 | 25.25 | 4652.0 | 3.671 | 39.629 |
| 170 | 28.66 | 5279.0 | 4.300 | 39.000 |

TABLE 5-continued (Fourth embodiment)

| 200 | 37.04 | 6201.0 | 4.999 | 38.301 |
|---|---|---|---|---|

The surface of the aspherical plastic lens $L_{13}$ of the first lens group $G_1$ according to the fourth embodiment and having the meniscus shape is arranged in such a manner that its lens surface confronting the screen has, similarly to the first embodiment, a shape having the positive plane refracting power which is gradually weakened from the optical axis toward the peripheral portion. The lens surface of the plastic lens $L_{13}$ confronting the CRT is arranged in such a manner that its negative plane refracting power is gradually strengthened from the optical axis toward the peripheral portion. As a result, high-degree spherical aberration and comatic aberration which cannot be perfectly corrected by the two, positive and the negative, glass meniscus lenses $L_{11}$ and $L_{12}$ confronting the screen can be satisfactorily corrected.

The aspherical lens $L_{13}$ in the third lens group $G_3$ is in the form of a biconvex shape in the paraxial region, while it is in a hat-like shape in the peripheral portion arranged in such a manner that the shape in the paraxial portion is, similarly to the first embodiment, in the form of a biconvex shape and that in the two peripheral portions is curved toward the screen. The surface of the aspherical lens $L_{32}$ confronting the screen is specially arranged in such a manner that the positive plane refracting power is gradually weakened from the optical axis to the peripheral portion and the positive plane refracting power is rapidly weakened in the peripheral portion. Furthermore, the peripheral portion of the plastic lens $L_{32}$ confronting the CRT has an inflection point at which the effect of the plane refracting power is inverted. That is, its shape is arranged in such a manner that the positive plane refracting power is gradually weakened from the optical axis toward the peripheral portion, while the positive plane refracting power is, on the contrary, strengthened when comes closer to the peripheral portion. As a result, the function of correcting the high-degree distortion and the comatic aberration is satisfactorily exhibited.

As shown in FIG. 8, the projecting lens according to the fifth embodiment is basically arranged in such a manner that the lens configuration is constituted similarly to the fourth embodiment.

Each of the aspherical plastic lenses $L_{13}$ and $L_{32}$ disposed in the first and the third lens group $G_1$ and $G_3$ has the aspherical surface, similarly to those according to the fourth embodiment. In particular, the aspherical surface of the aspherical plastic lens $L_{13}$ of the first group $G_1$ confronting the CRT is, in comparison to the fourth embodiment, arranged in such a manner that the negative refracting power is gradually strengthened from the optical axis toward the peripheral portion. Furthermore, the amount of the displacement from the reference spherical surface becomes the maximum value at the position at which the height from the optical axis becomes about 70% of the effective radius (half of the effective diameter).

The specific items according to the fifth embodiment is shown in Table 6.

TABLE 6

(Fifth embodiment)

Focal distance f = 171.33
Aperture ratio 1:1.25    Half field-angle 24.8°

| | r | d | ν | n | |
|---|---|---|---|---|---|
| 1 | 126.944 | 25.70 | 60.1 | 1.62286 | $L_{11}$ |
| 2 | 209.934 | 2.50 | | | |
| 3 | 164.885 | 5.00 | 28.1 | 1.73432 | $L_{12}$ |
| 4 | 109.110 | 9.20 | | | |
| 5 | 128.000 | 30.70 | 57.2 | 1.49354 | $L_{13}$ |
| 6 | 138.610 | 43.40 | | | |
| 7 | 140.352 | 44.00 | 60.1 | 1.62286 | $L_{21}$ |
| 8 | −118.003 | 7.00 | 25.3 | 1.81265 | |
| 9 | −182.421 | 6.00 | | | |
| 10 | 130.036 | 10.00 | 28.1 | 1.73432 | $L_{31}$ |
| 11 | 109.807 | 22.50 | | | |
| 12 | 562.170 | 22.00 | 57.2 | 1.49354 | $L_{32}$ |
| 13 | −642.000 | 40.80 | | | |
| 14 | −80.551 | 7.00 | 36.1 | 1.62409 | $L_{41}$ |
| 15 | ∞ | 21.00 | 56.3 | 1.43490 | E |
| 16 | ∞ | 7.00 | 51.3 | 1.53604 | G |
| 17 | ∞ | | | | |

Fifth surface (aspherical surface)
cone constant: k = 0
aspherical coefficient:
$A_2 = 0$, $A_4 = -0.6881E - 07$
$A_6 = 0.8922E - 11$, $A_8 = -0.7087E - 14$
$A_{10} = 0.6228E - 18$
Sixth surface (aspherical surface)
cone constant: k = 0.8527
aspherical coefficient:
$A_2 = 0$, $A_4 = 0.3704E - 08$
$A_6 = 0.1841E - 10$, $A_8 = -0.8949E - 14$
$A_{10} = 0.1054E - 17$
Twelfth surface (aspherical surface)
cone constant: k = −0.9900E + 01
aspherical coefficient:
$A_2 = 0$, $A_4 = -0.2981E - 07$
$A_6 = -0.5990E - 11$, $A_8 = -0.9702E - 14$
$A_{10} = 0.7785E - 19$
Thirteenth surface (aspherical surface)
cone constant: k = 0.4868E + 02
aspherical coefficient:
$A_2 = 0$, $A_4 = 0.8373E - 07$
$A_6 = -0.2721E - 10$, $A_8 = -0.1961E - 14$
$A_{10} = 0.3893E - 19$ $d_s = 14.400$

| Screen size (inch) | M | $d_0$ | $d_2$ | $d_{13}$ |
|---|---|---|---|---|
| 100 | 16.84 | 3105.5 | 1.787 | 41.513 |
| 110 | 18.51 | 3414.0 | 2.500 | 40.800 |
| 130 | 21.88 | 4034.5 | 3.627 | 39.673 |

The projecting lens according to the sixth embodiment is basically arranged in such a manner that the lens configuration of each of its first, the second and the fourth lens groups $G_1$, $G_2$ and $G_4$ is constituted similarly to the fourth embodiment. However, the third lens group $G_3$ is, similarly to the third embodiment, constituted only by the aspherical lens $L_{31}$ in the form of the meniscus shape and the convex side of which faces the screen.

According to the sixth embodiment, the aspherical surface of each of the plastic lenses $L_{13}$ and $L_{31}$ of the first and the third lens group $G_1$ and $G_3$ is, in comparison to the fourth and the fifth embodiments, arranged in such a manner that the amount of displacement from the reference spherical surface in the peripheral portion is enlarged so as to satisfactorily obtain the effect from the provision of the aspherical surface.

Specifically, the amount of the displacement from reference spherical surface in the peripheral portion of the aspherical surface of the aspherical lens $L_{13}$ of the first lens group $G_1$ confronting the screen is enlarged so that the positive refracting power is rapidly weakened. On the other hand, the aspherical surface of the same confronting the CRT is, different from the first and the second embodiments, arranged in such a manner that the negative plane refracting power is gradually weakened from the optical axis toward the peripheral portion. The aspherical surface of the aspherical lens $L_{31}$ of the third lens group $G_3$ confronting the screen is arranged in such a manner that the positive plane refracting power is gradually weakened from the optical axis toward the peripheral portion. On the other hand, the aspherical surface of the same confronting the CRT is arranged in such a manner that the negative plane refracting power is strengthened from the optical axis toward the peripheral portion.

The specific items according to the sixth embodiment are shown in Table 7.

Table 8 is a numerical table with respect to the conditions for each of the embodiments of the present invention.

TABLE 7

(Sixth embodiment)

Focal distance f = 170.05
Aperture ratio 1:1.24    Half field-angle 24.6°

| | r | d | ν | n | |
|---|---|---|---|---|---|
| 1 | 103.914 | 20.00 | 61.0 | 1.59142 | $L_{11}$ |
| 2 | 188.949 | 6.00 | | | |
| 3 | 160.632 | 8.50 | 29.3 | 1.72311 | $L_{12}$ |
| 4 | 93.944 | 12.40 | | | |
| 5 | 112.000 | 19.50 | 57.2 | 1.49354 | $L_{13}$ |
| 6 | 137.000 | 46.50 | | | |
| 7 | 124.915 | 38.00 | 61.0 | 1.59142 | $L_{21}$ |
| 8 | −110.052 | 7.00 | 27.3 | 1.76168 | |
| 9 | −182.929 | 21.50 | | | |
| 10 | 630.000 | 19.00 | 57.2 | 1.49354 | $L_{31}$ |
| 11 | 730.000 | 53.50 | | | |
| 12 | −80.551 | 7.00 | 36.1 | 1.62409 | $L_{41}$ |
| 13 | ∞ | 21.00 | 56.3 | 1.43490 | E |
| 14 | ∞ | 7.00 | 51.3 | 1.53604 | G |
| 15 | ∞ | | | | |

Fifth surface (aspherical surface)
cone constant: k = 1
aspherical coefficient:
$A_2 = 0$, $A_4 = -0.2651E - 06$
$A_6 = -0.3532E - 10$, $A_8 = -0.6293E - 14$
$A_{10} = 0.9000E - 18$
Sixth surface (aspherical surface)
cone constant: k = 1
aspherical coefficient:
$A_2 = 0$, $A_4 = -0.1407E - 06$
$A_6 = -0.3285E - 10$, $A_8 = -0.2883E - 14$
$A_{10} = 0.1000E - 17$
Tenth surface (aspherical surface)
cone constant: k = −0.5000E + 01
aspherical coefficient:
$A_2 = 0$, $A_4 = 0.1374E - 06$
$A_6 = -0.1864E - 11$, $A_8 = -0.1644E - 14$
$A_{10} = 0.7000E - 18$
Eleventh surface (aspherical surface)
cone constant: k = 0.5000E + 01
aspherical coefficient:
$A_2 = 0$, $A_4 = 0.3263E - 06$
$A_6 = 0.2697E - 11$, $A_8 = 0.4279E - 14$
$A_{10} = -0.4000E - 18$ $d_s = 19.500$

| Screen size (inch) | M | $d_0$ | $d_2$ | $d_{11}$ |
|---|---|---|---|---|
| 90 | 15.15 | 2800.0 | 4.915 | 54.585 |
| 100 | 16.83 | 3115.0 | 6.000 | 53.500 |
| 120 | 20.20 | 3740.0 | 7.620 | 51.880 |

TABLE 8

| Conditions According to the present invention | (Conditional numerals) Embodiments | | |
|---|---|---|---|
| | 4 | 5 | 6 |
| $f_F/f$ | 0.911 | 0.933 | 1.005 |
| $f/f_{G1}$ | 0.123 | 0.126 | 0.174 |
| $f/f_{G3}$ | 0.141 | 0.137 | 0.019 |
| $f/f_{as1}$ | 0.101 | 0.099 | 0.172 |
| $f/f_{as3}$ | 0.287 | 0.280 | 0.019 |
| $D_{12}/D_{24}$ | 1.182 | 1.150 | 1.201 |
| $d_6/f$ | 0.247 | 0.253 | 0.273 |
| $n_{22}-n_{21}$ | 0.190 | 0.190 | 0.170 |
| $\nu_{11}-\nu_{12}$ | 32.0 | 32.0 | 31.7 |

In the case where the focusing is performed in such a manner that the magnification is reduced by shortening the distance from the first lens surface of the projecting lens to the screen, a structure may be employed in which the two, the positive and the negative meniscus lenses $L_{11}$ and $L_{12}$ (the synthesized refracting power is positive) of the first lens group $G_1$ and made of glass and the negative lens $L_{41}$ of the fourth lens group $G_4$ nearest the CRT and the strong concave side of which faces the screen are fixed. Furthermore, the aspherical lens $L_{13}$ of the first lens group $G_1$ and the second lens group $G_2$ and the third lens group $G_3$ are integrally moved along the optical axis.

Therefore, the front fixed-lens unit and the rear fixed-lens unit fixed at the time of the focusing may be constituted by a plurality of lenses.

Furthermore, the second lens group $G_2$ and the third lens group $G_3$ are integrally moved along the optical axis with fixing the two, the positive and the negative meniscus lenses $L_{11}$ and $L_{12}$ of the first lens group $G_1$ and made of glass and the negative lens $L_{41}$ of the fourth lens group $G_4$ nearest the CRT and the strong concave side of which confronts the CRT, and simultaneously but independently from the above-described movements, the aspherical plastic lens $L_{13}$ of the first lens group $G_1$ is moved along the optical axis. As a result, the warp of the image surface projected on the screen can be extremely satisfactorily corrected without the fear of the deterioration in the spherical aberration.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is

1. A projecting lens comprising, when viewed from a screen:
    a first lens group having positive refracting power and an aspherical lens thereof;
    a second lens group having positive refracting power
    a third lens group having positive refracting power and an aspherical lens thereof; and
    a fourth lens group having negative refracting power, wherein the following conditions are met assuming that a focal distance of said first lens group is $f_{G1}$, a focal distance of said third lens group $f_{G3}$ and a focal distance of the overall system is f:

$$0 < f/f_{G1} < 0.25$$

$$0 < f/f_{G3} < 0.3.$$

2. A projecting lens according to claim 1, wherein said first lens group comprises, when viewed from said screen, a positive meniscus lens having a convex side which faces said screen, a negative meniscus lens having a convex side which faces said screen and an aspherical plastic lens in a form of a meniscus shape and having a convex side which faces said screen, wherein
    the following conditions are met assuming that a paraxial focal distance of said aspherical plastic lens is $f_{as1}$:

$$0 < f/f_{as1} < 0.25.$$

3. A projecting lens according to claim 2, wherein
    said second lens group comprises a positive achromatic laminated lens consisting of a positive lens and a negative lens; and
    said positive meniscus lens and said negative meniscus lens are constituted so as to meet the following conditions assuming that an Abbe number of said positive meniscus lens of said first lens group is $\nu_{11}$ and that of said negative meniscus lens is $\nu_{12}$:

$$25 < \nu_{11} - \nu_{12} < 36.$$

4. A projecting lens according to claim 2, wherein said aspherical plastic lens in the form of the meniscus shape included in said first lens group is arranged in such a manner that its lens surface confronting said screen is formed such that the positive refracting power is gradually weakened from an optical axis to a peripheral portion thereof and its lens surface confronting an object to be projected is formed such that the negative refracting power is gradually strengthened from the optical axis to the peripheral portion thereof.

5. A projecting lens according to claim 1, wherein said second lens group is disposed so as to meet the following conditions assuming that a length of air between said first lens group and said second lens group is $d_6$:

$$0.15 < d_6/f < 0.4.$$

6. A projecting lens according to claim 1, wherein said second lens group is constituted by a laminated lens consisting of a positive lens and a negative lens laminated to each other and constituted so as to meet the following conditions assuming that a refractive index of said positive lens and said negative lens are $n_{21}$ and $n_{22}$:

$$n_{22} - n_{22} > 0.15.$$

7. A projecting lens according to claim 1, wherein said third lens group comprises, when viewed from said screen, a negative meniscus lens having a convex side which faces said screen and an aspherical plastic lens having positive refracting power, and
    the following conditions are met assuming that a paraxial focal distance of said aspherical plastic lens is $f_{as3}$:

$$0 < f/f_{as3} < 0.4.$$

8. A projecting lens according to claim 7, wherein said aspherical plastic lens of said third lens group is arranged in such a manner that a portion a paraxial region is in a form of a biconvex shape and the both sides of its peripheral portion are in a form curved toward said screen for the purpose of making its lens surface confronting said screen such that a positive refracting power is gradually weakened from an optical axis toward a peripheral portion thereof, the positive refracting power is rapidly weakened in the peripheral portion thereof and making its lens surface confronting an object to be projected such that the positive refracting power is gradually weakened from the optical axis toward the peripheral portion thereof and the positive refracting power is gradually weakened when comes closer to the peripheral portion thereof.

9. A projecting lens according to claim 1, wherein aid third lens group is constituted by an aspherical plastic lens in a shape of a meniscus and having a convex side which faces the screen, and
   the following conditions are met assuming that a paraxial focal distance of said aspherical plastic lens is $f_{as3}$:

$$0 < f/f_{as3} < 0.4.$$

10. A projecting lens according to claim 9, wherein aid aspherical plastic lens of said third lens group is arranged in such a manner that the two sides thereof re curved toward an object to be projected for the purpose of making such that a lens surface confronting said screen is arranged in such a manner that the positive refracting power is gradually weakened from an optical axis toward a peripheral portion thereof and a lens surface confronting the object to be projected is arranged in such a manner that the negative refracting power is strengthened from the optical axis toward a peripheral portion thereof.

11. A projecting lens according to claim 1, wherein aid first, the second and the fourth lens groups are disposed so as to meet the following conditions assuming that an axial distance from a vertex of a lens surface o said first lens group nearest said screen to a vertex of a lens surface of said second lens group nearest said screen is $D_{12}$ and a distance from a vertex of a lens surface of said second lens group nearest an object to be projected to the vertex of the lens surface of said second lens group nearest said screen is $D_{24}$:

$$0.9 < D_{12}/D_{24} < 1.5.$$

12. A projecting lens according to claim 1, wherein the following numerical data are provided:

| | Focal distance f = 175.4 Projecting magnification −28.65 | | Aperture ratio 1:1.25 Half field-angle 25.0° | |
|---|---|---|---|---|
| | r | d | ν | n |
| 1 | 136.255 | 25.70 | 60.1 | 1.62286 | $L_{11}$ |
| 2 | 211.484 | 3.56 | | |
| 3 | 169.503 | 5.00 | 28.1 | 1.73432 | $L_{12}$ |
| 4 | 112.869 | 9.00 | | |
| 5 | 116.966 | 30.70 | 57.2 | 1.49354 | $L_{13}$ |
| 6 | 135.009 | 43.60 | | |
| 7 | 143.609 | 44.00 | 60.1 | 1.62286 | $L_{21}$ |
| 8 | −119.016 | 7.00 | 25.3 | 1.81265 | $L_{22}$ |
| 9 | −179.411 | 6.00 | | |
| 10 | 135.400 | 10.00 | 28.1 | 1.73432 | $L_{31}$ |
| 11 | 112.605 | 22.50 | | |
| 12 | 562.170 | 22.00 | 57.2 | 1.49354 | $L_{32}$ |
| 13 | −642.000 | 39.74 | | |
| 14 | −80.551 | 7.00 | 36.1 | 1.62409 | $L_{41}$ |
| 15 | ∞ | 21.00 | 56.3 | 1.43490 | S |
| 16 | ∞ | 7.00 | 51.3 | 1.53604 | G |
| 17 | ∞ | | | |

Fifth surface (aspherical surface)

-continued cone constant K = 0
aspherical coefficient
   $A_2 = 0$, $A_4 = -0.2251E - 07$
   $A_6 = 0.1125E - 10$, $A_8 = -0.7886E - 14$
   $A_{10} = 0.6228E - 18$
Sixth surface (aspherical surface)
cone constant K = 0.8527
aspherical coefficient
   $A_2 = 0$, $A_4 = 0.4705E - 07$
   $A_6 = 0.1871E - 10$, $A_8 = -0.9903E - 14$
   $A_{10} = 0.1054E - 17$
Twelfth surface (aspherical surface)
cone constant K = −9.9
aspherical coefficient
   $A_2 = 0$, $A_4 = -0.7093E - 08$
   $A_6 = -0.3989E - 11$, $A_8 = -0.8666E - 14$
   $A_{10} = 0.7785E - 19$
Thirteenth surface (aspherical surface)
cone constant K = 48.68
aspherical coefficient
   $A_2 = 0$, $A_4 = 0.9387E - 07$
   $A_6 = -0.2129E - 10$, $A_8 = -0.2330E - 14$
   $A_{10} = 0.3893E - 19$ where symbols $r_1$, $r_2$, $r_3$, ..., respectively represent a curvature radius of a lens surfaces when viewed from the screen, symbols $d_1$, $d_2$, $d_3$, ..., represent a thickness of a lens centers and an intervals between lenses, symbol n represents a refractive index with respect to a line e (λ=546.1 nm) of each of the lenses and ν represents an Abbe number with respect to the line e (λ=546.1 nm), symbols $f_1$, $f_2$ and $f_3$ respectively represent a focal distances of the lens groups and f represents the focal distance of the overall system, assuming that the symbol C represents a the curvature of the vertex, k represents a cone constant and $A_2$, $A_4$, $A_6$, $A_8$ and $A_{10}$ represent aspherical surface coefficients in rectangular coordinates in which X-axis stands for an optical direction, an aspherical surface is a rotation-symmetric aspherical surface expressed by:

$$X = \frac{CP}{1 + \sqrt{1 - kC^2P^2}} + A_2P^2 + A_4P^4 + A_6P^6 + A_8P^8 + A_{10}P^8$$

where $P = \sqrt{Y^2 + Z^2}$.

13. A projecting lens according to claim 1, wherein the following numerical data are provided:

| | Focal distance f = 171.3 Projecting magnification −18.51 | | Aperture ratio 1:1.25 Half field-angle 24.8° | |
|---|---|---|---|---|
| | r | d | ν | n |
| 1 | 126.944 | 25.70 | 60.1 | 1.62286 | $L_{11}$ |
| 2 | 209.934 | 2.50 | | |
| 3 | 164.885 | 5.00 | 28.1 | 1.73432 | $L_{12}$ |
| 4 | 109.110 | 9.20 | | |
| 5 | 128.000 | 30.70 | 57.2 | 1.49354 | $L_{13}$ |
| 6 | 138.610 | 43.40 | | |
| 7 | 140.352 | 44.00 | 60.1 | 1.62286 | $L_{21}$ |
| 8 | −118.003 | 7.00 | 25.3 | 1.81265 | $L_{22}$ |
| 9 | −182.421 | 6.00 | | |
| 10 | 130.036 | 10.00 | 28.1 | 1.73432 | $L_{31}$ |
| 11 | 109.807 | 22.50 | | |
| 12 | 562.170 | 22.00 | 57.2 | 1.49354 | $L_{32}$ |
| 13 | −642.000 | 40.80 | | |
| 14 | −80.551 | 7.00 | 36.1 | 1.62409 | $L_{41}$ |
| 15 | ∞ | 21.00 | 56.3 | 1.43490 | S |
| 16 | ∞ | 7.00 | 51.3 | 1.53604 | G |
| 17 | ∞ | | | |

Fifth surface (aspherical surface)

```
cone constant K = 0
aspherical coefficient
    A_2 = 0, A_4 = -0.6881E - 07
    A_6 = 0.8922E - 11, A_8 = -0.7087E - 14
    A_10 = 0.6228E - 18
Sixth surface (aspherical surface)
cone constant K = 0.8527
aspherical coefficient
    A_2 = 0, A_4 = 0.3704E - 08
    A_6 = 0.1841E - 10, A_8 = -0.8949E - 14
    A_10 = 0.1054E - 17
Twelfth surface (aspherical surface)
cone constant K = -9.9
aspherical coefficient
    A_2 = 0, A_4 = -0.2981E - 07
    A_6 = -0.5990E - 11, A_8 = -0.9702E - 14
    A_10 = 0.7785E - 19
Thirteenth surface (aspherical surface)
cone constant K = 48.68
aspherical coefficient
    A_2 = 0, A_4 = 0.8373E - 07
    A_6 = -0.2721E - 10, A_8 = -0.1961E - 14
    A_10 = 0.3893E - 19
``` where symbols $r_1, r_2, r_3, \ldots$, respectively represent a curvature radius of a lens surfaces when viewed from the screen, symbols $d_1, d_2, d_3, \ldots$, represent a thickness of a lens centers and an intervals between a lenses, symbol n represents a refractive index with respect to a line e ($\lambda = 546.1$ nm) of each of the lenses and $\nu$ represents an Abbe number with respect to the line e ($\lambda = 546.1$ nm), symbols $f_1$, $f_2$ and $f_3$ respectively represent a focal distance of the lens groups and f represents the focal distance of the overall system, assuming that the symbol C represents a curvature of the vertex, k represents a cone constant and $A_2$, $A_4$, $A_6$, $A_8$ and $A_{10}$ represent aspherical surface coefficients in rectangular coordinates in which X-axis stands for an optical direction, an aspherical surface is a rotation-symmetric aspherical surface expressed by:

$$X = \frac{CP}{1 + \sqrt{1 - kC^2P^2}} + A_2P^2 + A_4P^4 + A_6P^6 + A_8P^8 + A_{10}P^8$$

where $P = \sqrt{Y^2 + Z^2}$.

14. A projecting lens according to claim 1, wherein the following numerical data are provided:

| Focal distance f = 171.6 | | Aperture ratio 1:1.24 | | |
|---|---|---|---|---|
| Projecting magnification −18.58 | | Half field-angle 24.7° | | |
| | r | d | ν | n | |
| 1 | 108.163 | 20.00 | 61.0 | 1.59142 | $L_{11}$ |
| 2 | 173.737 | 6.00 | | | |
| 3 | 147.609 | 8.50 | 26.3 | 1.76859 | $L_{12}$ |
| 4 | 98.473 | 12.60 | | | |
| 5 | 113.000 | 20.00 | 57.2 | 1.49354 | $L_{13}$ |
| 6 | 136.000 | 47.40 | | | |
| 7 | 122.785 | 38.00 | 61.0 | 1.59142 | $L_{21}$ |
| 8 | −116.908 | 7.00 | 25.5 | 1.79193 | $L_{22}$ |
| 9 | −185.583 | 15.00 | | | |
| 10 | 790.000 | 20.00 | 57.2 | 1.49354 | $L_{31}$ |
| 11 | 800.000 | 58.80 | | | |
| 12 | −80.551 | 7.00 | 36.1 | 1.62409 | $L_{41}$ |
| 13 | ∞ | 21.00 | 56.3 | 1.43490 | S |
| 14 | ∞ | 7.00 | 51.3 | 1.53604 | G |
| 15 | ∞ | | | | |

```
Fifth surface (aspherical surface)
cone constant K = 1
aspherical coefficient
    A_2 = 0, A_4 = -0.2231E - 06
    A_6 = -0.2793E - 10, A_8 = -0.7227E - 14
    A_10 = 0.9000E - 18
Sixth surface (aspherical surface)
cone constant K = 1
aspherical coefficient
    A_2 = 0, A_4 = -0.9316E - 07
    A_6 = -0.2833E - 10, A_8 = -0.4056E - 14
    A_10 = 0.1000E - 17
Tenth surface (aspherical surface)
cone constant K = -2
aspherical coefficient
    A_2 = 0, A_4 = 0.1781E - 06
    A_6 = -0.7941E - 11, A_8 = 0.2876E - 15
    A_10 = -0.7000E - 18
Eleventh surface (aspherical surface)
cone constant K = 2
aspherical coefficient
    A_2 = 0, A_4 = 0.3784E - 06
    A_6 = -0.2058E - 11, A_8 = 0.6466E - 14
    A_10 = -0.4000E - 18
``` where symbols $r_1, r_2, r_3, \ldots$, respectively represent a curvature radius of a lens surfaces when viewed from the screen, symbols $d_1, d_2, d_3, \ldots$, represent a thickness of a lens centers and an intervals between lenses, symbol n represents a refractive index with respect to a line e ($\lambda = 546.1$ nm) of each of the lenses and $\nu$ represents an Abbe number with respect to the line e ($\lambda = 546.1$ nm), symbols $f_1$, $f_2$ and $f_3$ respectively represent a focal distances of the lens groups and f represents the focal distance of the overall system, assuming that the symbol C represents a curvature of the vertex, k represents a cone constant and $A_2$, $A_4$, $A_6$, $A_8$ and $A_{10}$ represent aspherical surface coefficients in rectangular coordinates in which X-axis stands for an optical direction, an aspherical surface is a rotation-symmetric aspherical surface expressed by:

$$X = \frac{CP}{1 + \sqrt{1 - kC^2P^2}} + A_2P^2 + A_4P^4 + A_6P^6 + A_8P^8 + A_{10}P^8$$

where $P = \sqrt{Y^2 + Z^2}$.

15. A projecting lens comprising, when viewed from a screen:

a first lens group having positive refracting per and including a plurality of meniscus lenses each having a convex side which faces said screen and an aspherical lens capable of moving in a direction of an optical axis at a time of focusing;

a second lens group having positive refracting power and capable of moving in a direction of the optical axis at the time of focusing;

a third lens group having positive refracting power and including an aspherical lens capable of moving in the direction of the optical axis together with said second lens group at the time of focusing; and a fourth lens group having negative refracting power, wherein the following conditions are met assuming that a focal distance of said first lens group is $f_{G1}$, a focal distance of said third lens group is $f_{G3}$ and a focal distance of an overall body of a system is f:

$0 < f/f_{G1} < 0.25$ $0 < f/f_{G3} < 0.3$.

16. A projecting lens according to claim 15, wherein said first lens group comprises, when viewed from said screen, positive meniscus lens having a convex side which faces said screen, a negative meniscus, lens having a convex side which faces said screen and an aspherical plastic lens in a form of a meniscus shape having a convex side which faces said screen, wherein
at least said positive meniscus lens of said first lens group and said fourth lens group are fixed and at least said aspherical lens of said first lens group, said second lens group and said third lens group are arranged movable in a direction of the optical axis at the time of focusing.

17. A projecting lens comprising:
a movable lens group movable along a optical axis for focusing and having positive refracting power;
a front fixed-lens unit fixed on the optical axis more adjacent to a screen than said movable lens group and having positive refracting power; and
a rear fixed-lens group fixed on the optical axis more adjacent to an object to be projected than said movable lens group and having negative refracting power, wherein the following conditions are met assuming that a focal distance of said movable lens group is $f_F$ and a focal distance of an overall body of a system is f:

$$0.8 < f_F/f < 1.1.$$

18. A projecting lens according to claim 17, wherein the following numerical data are provided:

| Focal distance f = 175.58 | | | | |
|---|---|---|---|---|
| Aperture ratio 1:1.25 | | Half field-angle 25.0° | | |
| | r | d | ν | n |
| 1 | 127.725 | 25.00 | 60.1 | 1.62286 | $L_{11}$ |
| 2 | 210.209 | 4.30 | | |
| 3 | 164.885 | 5.00 | 28.1 | 1.73432 | $L_{12}$ |
| 4 | 109.110 | 9.20 | | |
| 5 | 128.000 | 30.70 | 57.2 | 1.49354 | $L_{13}$ |
| 6 | 138.610 | 43.40 | | |
| 7 | 140.352 | 44.00 | 60.1 | 1.62286 | $L_{21}$ |
| 8 | −118.003 | 7.00 | 25.3 | 1.81265 | |
| 9 | −182.421 | 6.00 | | |
| 10 | 130.036 | 10.00 | 28.1 | 1.73432 | $L_{31}$ |
| 11 | 109.807 | 22.50 | | |
| 12 | 562.170 | 22.00 | 57.2 | 1.49354 | $L_{32}$ |
| 13 | −642.000 | 39.00 | | |
| 14 | −80.551 | 7.00 | 36.1 | 1.62409 | $L_{41}$ |
| 15 | ∞ | 21.00 | 56.3 | 1.43490 | E |
| 16 | ∞ | 7.00 | 51.3 | 1.53604 | G |
| 17 | ∞ | | | | |

Fifth surface (aspherical surface)
cone constant: k = 0
aspherical coefficient:
 $A_2 = 0$, $A_4 = -0.6745E - 07$
 $A_6 = 0.8949E - 11$, $A_8 = -0.7054E - 14$
 $A_{10} = 0.6228E - 18$
Sixth surface (aspherical surface)
cone constant: k = 0.8527
aspherical coefficient:
 $A_2 = 0$, $A_4 = 0.2391E - 08$
 $A_6 = 0.1816E - 10$, $A_8 = -0.8810E - 14$
 $A_{10} = 0.1054E - 17$
Twelfth surface (aspherical surface)
cone constant: k = −0.9900E + 01
aspherical coefficient:
 $A_2 = 0$, $A_4 = -0.9882E - 08$
 $A_6 = -0.1060E - 11$, $A_8 = -0.8317E - 14$
 $A_{10} = 0.7785E - 19$
Thirteenth surface (aspherical surface)
cone constant: k = 0.4868E + 02
aspherical coefficient:

-continued $A_2 = 0$, $A_4 = 0.1002E - 06$
 $A_6 = -0.2191E - 10$, $A_8 = -0.4955E - 15$
 $A_{10} = 0.3893E - 19$

| | $d_s = 14.400$ | | | |
|---|---|---|---|---|
| Screen size (inch) | M | $d_0$ | $d_2$ | $d_{13}$ |
| 150 | 25.25 | 4652.0 | 3.671 | 39.629 |
| 170 | 28.66 | 5279.0 | 4.300 | 39.000 |
| 200 | 37.04 | 6201.0 | 4.999 | 38.301 | where symbols $r_1$, $r_2$, $r_3$, ..., respectively represent a curvature radius of a lens surfaces when viewed from the screen, symbols $d_1$, $d_2$, $d_3$, ..., represent a thickness of a lens centers and an intervals between lenses, symbol n represents a refractive index with respect to a line e (λ=546.1 nm) of each of the lenses and ν represents an Abbe number with respect to the line e (λ=546.1 nm) symbol f represents the focal distance of the overall system, while M represents a projecting magnification and $d_O$ represents a distance from the screen to a first surface of the projecting lens, symbol $d_S$ represents a distance from a sixth surface to a diaphragm, assuming that the symbol C represents a curvature of a vertex, k represents the cone constant and $A_2$, $A_4$, $A_6$, $A_8$ and $A_{10}$ represent aspherical surface coefficients in rectangular coordinates in which X-axis stands for an optical direction, a aspherical surface is a rotation-symmetric aspherical surface expressed by:

$$X = \frac{CP}{1 + \sqrt{1 - kC^2P^2}} + A_2P^2 + A_4P^4 + A_6P^6 + A_8P^8 + A_{10}P^8$$

where $P = \sqrt{Y^2 + Z^2}$.

19. A projecting lens according to claim 17, wherein the following numerical data are provided:

| Focal distance f = 171.33 | | | | |
|---|---|---|---|---|
| Aperture ratio 1:1.25 | | Half field-angle 24.8° | | |
| | r | d | ν | n |
| 1 | 126.944 | 25.70 | 60.1 | 1.62286 | $L_{11}$ |
| 2 | 209.934 | 2.50 | | |
| 3 | 164.885 | 5.00 | 28.1 | 1.73432 | $L_{12}$ |
| 4 | 109.110 | 9.20 | | |
| 5 | 128.000 | 30.70 | 57.2 | 1.49354 | $L_{13}$ |
| 6 | 138.610 | 43.40 | | |
| 7 | 140.352 | 44.00 | 60.1 | 1.62286 | $L_{21}$ |
| 8 | −118.003 | 7.00 | 25.3 | 1.81265 | |
| 9 | −182.421 | 6.00 | | |
| 10 | 130.036 | 10.00 | 28.1 | 1.73432 | $L_{31}$ |
| 11 | 109.807 | 22.50 | | |
| 12 | 562.170 | 22.00 | 57.2 | 1.49354 | $L_{32}$ |
| 13 | −642.000 | 40.80 | | |
| 14 | −80.551 | 7.00 | 36.1 | 1.62409 | $L_{41}$ |
| 15 | ∞ | 21.00 | 56.3 | 1.43490 | E |
| 16 | ∞ | 7.00 | 51.3 | 1.53604 | G |
| 17 | ∞ | | | | |

Fifth surface (aspherical surface)
cone constant: k = 0
aspherical coefficient:
 $A_2 = 0$, $A_4 = -0.6881E - 07$
 $A_6 = 0.8922E - 11$, $A_8 = -0.7087E - 14$
 $A_{10} = 0.6228E - 18$
Sixth surface (aspherical surface)
cone constant: k = 0.8527
aspherical coefficient:
 $A_2 = 0$, $A_4 = 0.3704E - 08$ -continued

```
A₆ = 0.1841E − 10, A₈ = −0.8949E − 14
A₁₀ = 0.1054E − 17
Twelfth surface (aspherical surface)
cone constant: k = −0.9900E + 01
aspherical coefficient:
  A₂ = 0, A₄ = −0.2981E − 07
  A₆ = −0.5990E − 11, A₈ = −0.9702E − 14
  A₁₀ = 0.7785E − 19
Thirteenth surface (aspherical surface)
cone constant: k = 0.4868E + 02
aspherical coefficient:
  A₂ = 0, A₄ = 0.8373E − 07
  A₆ = −0.2721E − 10, A₈ = −0.1961E − 14
  A₁₀ = 0.3893E − 19
```

$d_s = 14.400$

| Screen size (inch) | M | $d_0$ | $d_2$ | $d_{13}$ |
|---|---|---|---|---|
| 100 | 16.84 | 3105.5 | 1.787 | 41.513 |
| 110 | 18.51 | 3414.0 | 2.500 | 40.800 |
| 130 | 21.88 | 4034.5 | 3.627 | 39.673 | where symbols $r_1, r_2, r_3, \ldots$, respectively represent a curvature radius of a lens surfaces when viewed from the screen, symbols $d_1, d_2, d_3, \ldots$, represent a thickness of a lens centers and an intervals between lenses, symbol n represents a refractive index with respect to a line e ($\lambda = 546.1$ nm) of each of the lenses and $\nu$ represents an Abbe number with respect to the line e ($\lambda = 546.1$ nm), symbol f represents the focal distance of the overall system, while M represents a projecting magnification and $d_O$ represents a distance from the screen to a first surface of the projecting lens, symbol $d_S$ represents a distance from a sixth surface to a diaphragm, assuming that the symbol C represents a curvature of a vertex, k represents a cone constant and $A_2, A_4, A_6, A_8$ and $A_{10}$ represent aspherical surface coefficients in rectangular coordinates in which X-axis stands for an optical direction, a aspherical surface is a rotation-symmetric aspherical surface expressed by:

$$X = \frac{CP}{1 + \sqrt{1 - kC^2 P^2}} + A_2 P^2 + A_4 P^4 + A_6 P^6 + A_8 P^8 + A_{10} P^8$$

where $P = \sqrt{Y^2 + Z^2}$.

20. A projecting lens according to claim 17, wherein said front fixed-lens unit is constituted by a portion of a first lens group having positive refracting power, said movable lens group is constituted, when viewed from said screen, by a movable lens unit constituting said first lens group together with said front fixed-lens unit and including an aspherical lens, a second lens group having positive refracting power and a third lens group having positive refracting power and including an aspherical lens, said rear fixed-lens unit is constituted by a fourth lens group having negative refracting power, and the following conditions are met assuming that a focal distance of sale first lens group is $f_{G1}$, a focal distance of said third lens group is $f_{G3}$ and a focal distance of the overall body of the system is f:

$0 < f/f_{G1} < 0.25, \ 0 < \text{pi } f/f_{G3} < 0.3.$

21. A projecting lens according to claim 20, wherein aid first lens group comprises, when viewed from said screen, a fixed positive meniscus lens having a convex side which faces said screen, a negative meniscus lens having a convex side which faces said screen and a movable aspherical plastic lens in a form of a meniscus shape having convex side which faces said screen, and the following conditions are met assuming that a paraxial focal distance of said aspherical plastic lens is $f_{as1}$:

$0 < f/f_{as1} < 0.25.$

22. A projecting lens according to claim 21, wherein said aspherical plastic lens in the form of the meniscus shape included in said first lens group is arranged in such a manner that its lens surface confronting said screen is formed such that a positive refracting power is gradually weakened from the optical axis to a peripheral portion thereof and its lens surface confronting an object to be projected is formed such that the negative refracting power is gradually strengthened from the optical axis to the peripheral portion thereof.

23. A projecting lens according to claim 20, wherein said first lens group comprises, when viewed from said screen, a fixed positive meniscus lens constituting said front fixed-lens unit and having a convex side of which faces said screen, a movable negative meniscus lens constituting a portion of said movable lens group and having a convex side which faces said screen and a movable aspherical plastic lens in a form of a meniscus shape having a convex side which faces said screen.

24. A projecting lens according to claim 20, wherein aid first lens group comprises, when viewed from said screen, a fixed positive meniscus lens constituting said front fixed-lens unit and having a convex side which faces said screen, a fixed negative meniscus lens, having a convex side which faces said screen and a movable aspherical plastic lens constituting a portion of said movable lens group and having a convex side which faces said screen.

25. A projecting lens according to claim 20, wherein said second lens group comprises a positive achromatic laminated lens consisting of a positive lens and a negative lens; and said positive meniscus lens and said negative meniscus lens are constituted so as to meet the following conditions assuming that an Abbe number of said positive meniscus lens of said first lens group is $\nu_{11}$ and that of said negative meniscus lens is $\nu_{12}$:

$25 < \nu_{11} - \nu_{12} < 36.$

26. A projecting lens according to claim 20, wherein said second lens group is disposed so as to meet the following conditions assuming that a length of air between said first lens group and said second lens group is d first lens group and said second lens group is $d_6$:

$0.15 < d_6/f < 0.4.$

27. A projecting lens according to claim 20, wherein said second lens group is constituted by a laminated lens consisting of a positive lens and a negative lens laminated to each other and constituted so as to meet the following conditions assuming that a refractive index of said positive lens and said negative lens are $n_{21}$ and $n_{22}$:

$n_{22} - n_{21} > 0.15.$

28. A projecting lens according to claim 20, wherein said third lens group comprises, when viewed from said screen, a negative meniscus lens having a convex side which faces said screen and an aspherical plastic lens having positive refracting power, and the following conditions are met assuming that a paraxial focal distance of said aspherical plastic lens is $f_{as3}$:

$0 < f/f_{as3} < 0.4.$

29. A projecting lens according to claim 28, wherein said aspherical plastic lens of said third lens group is arranged in such a manner that a portion in a paraxial region is in a form of a biconvex shape and the both sides of its peripheral portion are in a form curved toward said screen for the purpose of making a lens surface confronting said screen such that a positive refracting power is gradually weakened from the optical axis toward a peripheral portion thereof, the positive refracting power is rapidly weakened in a peripheral portion thereof and making its lens surface confronting an object to be projected such that a positive refracting power is gradually weakened from the optical axis toward a peripheral portion thereof and a positive refracting power is gradually weakened closer to the peripheral portion thereof.

30. A projecting lens according to claim 20, wherein said third lens group is constituted by an aspherical plastic lens in a shape of a meniscus and having a convex side which faces a screen, and the following conditions are met assuming that a paraxial focal distance of said aspherical plastic lens is $f_{as3}$:

$0 < f/f_{as3} < 0.4.$

31. A projecting lens according to claim 30, wherein said aspherical plastic lens of said third lens group is arranged in such a manner that the two sides thereof are curved toward an object to be projected for the purpose of making such that a lens surface confronting said screen is arranged in such a manner that a positive refracting power is gradually weakened from the optical axis toward a peripheral portion thereof and a lens surface confronting the object to be projected is arranged in such a manner that a negative refracting power is strengthened from the optical axis toward a peripheral portion thereof.

32. A projecting lens according to claim 20, wherein said first, the second and the fourth lens groups are disposed so as to meet the following conditions assuming that an axial distance from a vertex of a lens surface of said first lens group nearest said screen to a vertex of a lens surface of said second lens group nearest said screen is $D_{12}$ and a distance from a vertex of a lens surface of said second lens group nearest an object to be projected to the vertex of the lens surface of said second lens group nearest said screen is $D_{24}$:

$0.9 < D_{12}/D_{24} < 1.5.$

* * * * *